US011836125B1

(12) United States Patent
Skinner et al.

(10) Patent No.: US 11,836,125 B1
(45) Date of Patent: Dec. 5, 2023

(54) SCALABLE DATABASE DEPENDENCY MONITORING AND VISUALIZATION SYSTEM

(71) Applicant: Amazon Technologies, Inc., Seattle, WA (US)

(72) Inventors: Joseph Skinner, Seattle, WA (US); Alex Anto Chriayath, Seattle, WA (US); Shobhit Goyal, Bellevue, WA (US); Vinay Boinepally, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 102 days.

(21) Appl. No.: 16/511,979

(22) Filed: Jul. 15, 2019

(51) Int. Cl.

| | |
|---|---|
| ***G06F 16/21*** | (2019.01) |
| ***G06F 16/901*** | (2019.01) |
| ***G06F 11/30*** | (2006.01) |
| ***G06F 16/904*** | (2019.01) |

(52) U.S. Cl.
CPC ........ *G06F 16/214* (2019.01); *G06F 11/3006* (2013.01); *G06F 16/904* (2019.01); *G06F 16/9024* (2019.01)

(58) Field of Classification Search
CPC .... G06F 16/248; G06F 16/214; G06F 16/904; G06F 16/3024; G06F 11/3006
See application file for complete search history.

(56) References Cited

U.S. PATENT DOCUMENTS

| | | | | |
|---|---|---|---|---|
| 8,352,397 | B2 | 1/2013 | Rubin et al. | |
| 8,856,182 | B2 | 10/2014 | Olson | |
| 8,892,504 | B2 | 11/2014 | Wan | |
| 10,140,553 | B1 * | 11/2018 | Vasisht | G06N 3/0454 |
| 10,164,982 | B1 * | 12/2018 | Lazarovitz | H04W 12/122 |
| 2011/0258224 | A1 * | 10/2011 | Hagerty | G06F 16/21 707/769 |
| 2014/0040182 | A1 * | 2/2014 | Gilder | G06Q 40/12 707/602 |
| 2017/0098280 | A1 * | 4/2017 | O'Brien | G06Q 40/08 |
| 2019/0155660 | A1 * | 5/2019 | McQuighan | G06F 9/5022 |
| 2019/0163770 | A1 * | 5/2019 | Bean | G06F 16/256 |
| 2019/0197220 | A1 * | 6/2019 | Anderson | G09B 7/00 |
| 2019/0324989 | A1 * | 10/2019 | Borochoff | G06F 16/173 |
| 2019/0392063 | A1 * | 12/2019 | Tosukhowong | G06F 16/2365 |
| 2020/0241908 | A1 * | 7/2020 | Dornemann | G06F 11/2076 |

* cited by examiner

*Primary Examiner* — Mariela Reyes
*Assistant Examiner* — Courtney Harmon
(74) *Attorney, Agent, or Firm* — Robert C. Kowert; Kowert, Hood, Munyon, Rankin & Goetzel, P.C.

(57) ABSTRACT

Computer systems and associated methods are disclosed to implement a database dependency monitoring system (DDMS) that periodically collects activity data from an inventory of databases and generates dependency graphs indicating data dependencies among the databases. In embodiments, the collection of the activity data may be implemented as three sets of jobs that are run periodically. In the first job set, the databases are checked to see if they can be connected to. In the second job set, queries are run in each of the available databases to generate output files containing their activity data. In a third job set, the output files are transformed and loaded into a metadata store, which can be used to generate the dependency graph based on the collected activity data. Advantageously, the disclosed system may be used to adaptively monitor a changing inventory of many databases, while causing little or no performance impact on the databases.

20 Claims, 16 Drawing Sheets output file 156 database statement 410 nested object 420 nested object 425 executor 430 executor 435

```
{
  "sql_id":"2660pgwqv83ba",
  "sql_text":
    "select product_id, condition",
  "operation":"TABLE ACCESS",
  "executions":203683,
  "object_info:":[{
    "object_name":"PRODUCTS",
    "object_type":"TABLE",
    "object_owner":"OWNER1"
  }],
  "db_info":{
    "dbid":779173888,
    "database_name":"PRODUCT_DB",
    "database_role":"PRIMARY"
  },
  "user_info":[
    {
      "machine":"app-node-2039",
      "username":"APP_USER2",
      "module":"APPv3"
    },
    {
      "machine":"station-02",
      "username":"ADMIN_USER",
      "module":"ADMIN_VIEW"
    }
  ]
}
```

FIG. 4

VIEW DATABASE 600

DATABASE: 610

NAME: PRODUCT_DB
OWNER: OWNER1
GROUP: GROUP_2

MIGRATION PROGRAM: 612 MIGRATION1
DEPRECATION DATE: 614 2019-10-31
MIGRATION STATUS: 616 33%

INSTANCES 620 | OBJECTS 630 | ACTIVITY 640 | MODULES 650 | MIGRATION 660 | DEPENDENCIES 670

*instance table 622*

| INSTANCE | HOST | HOST TYPE | AVAILABLE? | LAST CONNECT |
|---|---|---|---|---|
| PRIMARY | imsv3-04.company.com | LARGE-11 | YES | 9:01 AM |
| STANDBY | imsv3-06.company.com | MEDIUM-02 | YES | 9:02 AM |
| STANDBY | imsv3-07.company.com | MEDIUM-02 | YES | 9:03 AM |
| STANDBY | imsv3-12.company.com | MEDIUM-02 | NO | TWO DAYS AGO |
| STANDBY | imsv3-14.company.com | MEDIUM-02 | YES | 9:05 AM |

VIEW CONNECTION HISTORY 624

ATTEMPT CONNECTION 626

FIG. 6A

VIEW DATABASE 600

DATABASE: 610

NAME: PRODUCT_DB
OWNER: OWNER1
GROUP: GROUP_2

MIGRATION PROGRAM: 612 MIGRATION1
DEPRECATION DATE: 614 2019-10-31
MIGRATION STATUS: 616 33%

INSTANCES 620 | OBJECTS 630 | ACTIVITY 640 | MODULES 650 | MIGRATION 660 | DEPENDENCIES 670

OBJECT TYPE: MATERIALIZED VIEWS

*objects table 632*

| OBJECT NAME | ROOT OBJECT | DB LINK | ROOT DB | ROOT HAS CRUD? | # ROOT READERS |
|---|---|---|---|---|---|
| PROD_SUMMARY | PRODUCTS | | | YES | 1 |
| OFFICE_ADDRESSES | OFFICE_ADDRESSES | HR | HR_DB | NO | 12 |
| GLOBAL_PROD_LIST | PROD_LIST | REGION_A | REGION_A | YES | 3 |
| GLOBAL_PROD_LIST | PROD_LIST | REGION_B | REGION_B | YES | 3 |
| GLOBAL_PROD_LIST | PROD_LIST | REGION_C | REGION_C | YES | 3 |

VIEW DEPENDENCY GRAPH 634

FIG. 6B

SCALABLE DATABASE DEPENDENCY MONITORING AND VISUALIZATION SYSTEM

BACKGROUND

Recent advances in virtualization technologies have increased the reliability, scalability, and cost efficiency of network-accessible storage service. To transition applications to the cloud, application owners are increasingly migrating their existing databases into database systems implemented in network-accessible service provider networks. However, some companies may maintain a large number of databases across numerous business units. Over time, these databases may grow dependent on one another, making it difficult to plan how the databases should be migrated in a staged fashion. For example, in some companies, one database may depend on several producer databases for ongoing load jobs and materialized views, while in turn provide data feeds several consumer databases. These data dependencies can in some cases form complicated chains or cycles, making it nearly impossible to understand actual data flows among these databases and data lineage. This problem is aggravated in situations where the data dependencies are evolving over time, for example, during a database migration process. Practical solutions are needed to programmatically obtain and analyze information about data dependencies among databases in a large enterprise, to better support activities such as database inventory management and database migrations.

BRIEF DESCRIPTION OF THE DRAWINGS

FIG. 4 depicts an example output file that includes some activity data collected by the DDMS, according to some embodiments.

FIGS. 6A to 6F depict example graphical user interfaces (GUIs) that provide different views of activity data and other data collected by the DDMS, according to some embodiments.

Figure 1:
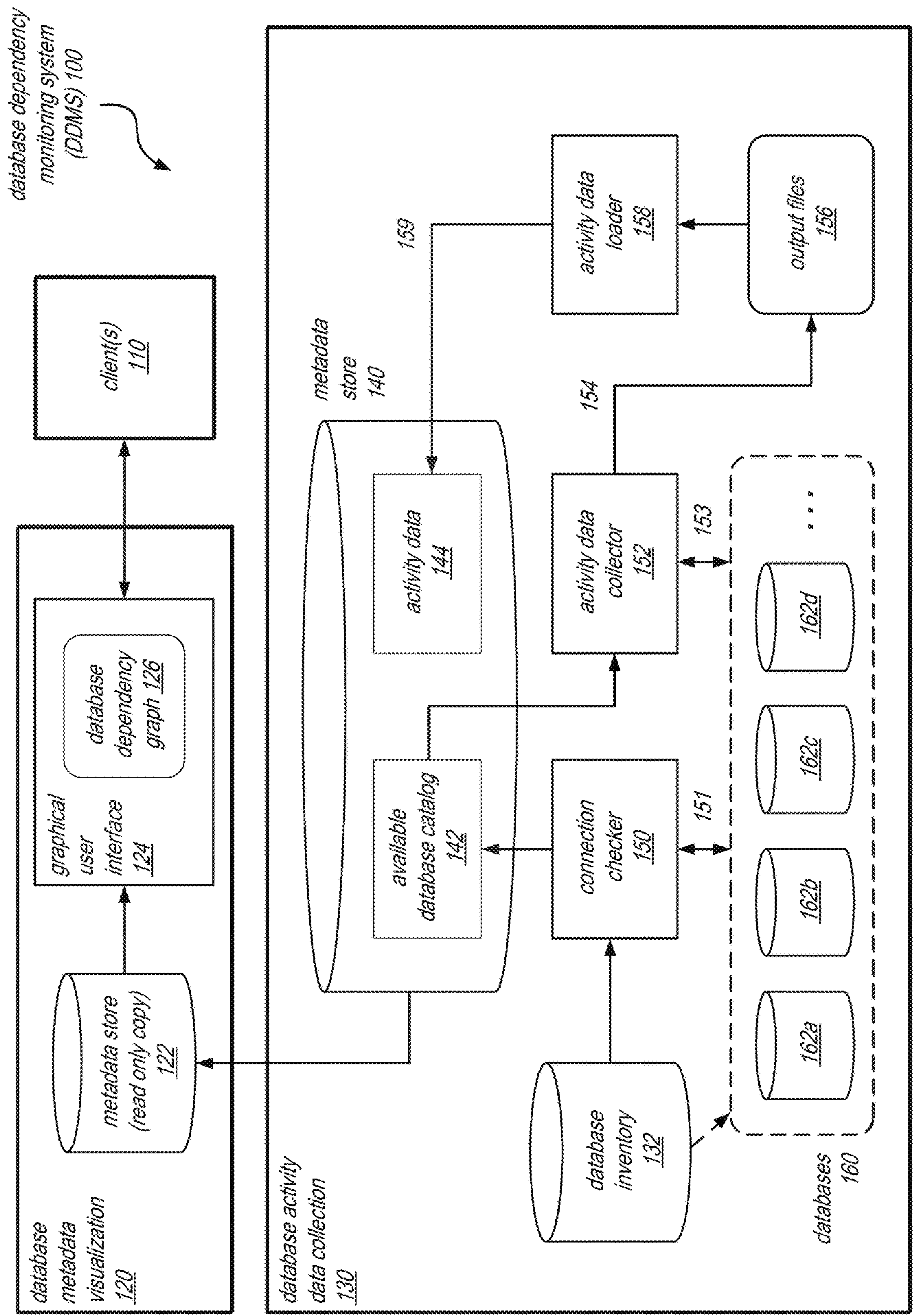
FIG. 1 is a block diagram illustrating an example database dependency monitoring system (DDMS) that collects activity data from databases in an inventory and generates a database dependency graph from the activity data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

The systems and methods are disclosed herein to implement embodiments of a database dependency monitoring system (DDMS) that collects activity data from databases in a database inventory and generates a database dependency graph from the activity data.

Many large companies maintain large numbers of legacy databases across multiple business units. These databases may have a large number of data dependencies among one another, where no single business unit or database owner has a global view or control of all the dependencies. For example, in some companies, one database may depend on several producer databases in other business units for ongoing load jobs and materialized views, while in turn provide data feeds to several consumer databases in other business units. The complexity of these data dependencies can in some cases make it nearly impossible to understand actual data flows among these databases and data lineage, and make planning decisions about the databases. The problem is aggravated in situations where the data dependencies are evolving over time, for example, during a database migration process.

Accordingly, in embodiments described herein, a DDMS is provided to implement an enterprise wide collection and visualization of these dependencies and their lineage. In some embodiments, the DDMS may periodically (e.g. on a scheduled basis) build an internal catalog of databases with verified connectivity and certain database metadata information. In some embodiments, the catalog of available databases may be used by the DDMS to periodically (e.g. multiple times per day) collect metrics or activity data from the databases. In some embodiments, the collected activity data may include metrics about the database objects, ownership, manipulation, logons, and size of the database. In some embodiments, the collected activity data may include different types of database statements that were executed by the database during a period, the executors of individual database statements, and the database objects that were the target of the individual database statements. In some embodiments, the collection of activity data may be performed so that it leaves no footprint on the database and causes little or no performance impact on the normal database traffic.

In some embodiments, once the activity data or metrics are collected from the databases, they are placed in a centralized location. In some embodiments, the results of the collection may be stored as a set of external output files, which may be normalized into an object-based format. In some embodiments, the output files may be loaded into a metadata store to provide visualization via a GUI-based visualization system. In some embodiments, the GUI-based visualization system may be implemented using a web server that provides the visualization in generated webpages that can be viewed by a web browser. In some embodiments, the visualization system may provide information such as day over day statistics regarding database activity, database growth, database dependencies, among other types of dynamic metadata about the databases. In some embodiments, the visualization system may be used to generate a data dependency graph for the databases, to allow users to quickly identify upstream and downstream dependencies across the entire inventory of databases in seconds. In some embodiments, the data dependency graph may indicate dependencies for individual database objects, which may include other database objects, applications, or users. In some embodiments, the dependency graph may be created by repeatedly querying the activity data to generate multiple layers of dependencies, which may include not just immediate producers or consumers for a database or object, but also the producers for the producers and the consumers of the consumers. Accordingly, in some embodiments, the dependency graph may indicate all upstream data sources that contribute to a database or an object, and all downstream consumers for a database or object, thereby greatly simplifying manual processes of determining such dependency chains. In some embodiments, the visualization system may be implemented as part of a database migration management system, which may be used to plan, monitor, and carry out staged migrations of a large numbers of databases. In some embodiments, the database migration management system may be used to manage the migration of databases from one or more legacy database management systems (which may reside at a client premises) to one or more other database management systems (which may reside at a network-accessible service provider network). In some embodiments, the database migration management system may be able to monitor database activities at both the client premises and the network-accessible service provider network, in order to provide a comprehensive view of the status of the migration.

Embodiments of the DDMS implement computer functionality that improves upon other computer systems for collecting and visualizing database metadata, to provide some or all the following benefits to these computer systems.

In one respect, embodiments of the DDMS implements a periodic data collection process to allow the visualization system to operate on the most recent activity data from the databases. In some embodiments, the DDMS implements a robust process to allow the periodic data collection to be performed regardless of changes in the database inventory and with no or little human intervention. The periodic collect of activity data also allows the visualization system to present the data in a time-based fashion, for example, as in plots of time trends. Additionally, based on periodic collections, the visualization system may be implemented to recognize and present those data dependencies that are the most significant, based on their current usage, instead of relying on just the state of static metadata about the databases.

In another respect, embodiments of the DDMS implements the data collection process in scalable jobs, which can be scaled to very large inventories of databases. In some embodiments, the data collection may be performed using scalable work queues and scalable groups of worker nodes, which can perform data collections from the individual databases in parallel. In some embodiments, the scalable work queues and scalable worker node groups may be implemented using services provided by a network-accessible service provider network, so that the underlying hardware for these services need not be maintained by the client.

In another respect, the DDMS may implement a separate connection checking or verification step as part of the data collection process, which allows the data collection process to be executed more efficiently. In many situations, the databases in the inventory may be changing over time. For example, during a data migration process, some databases may be deprecated, so that they are no longer running or so that access to these databases are disabled. The connection checking step of the data collection process allows the DDMS to automatically cope with these changes. Because connection issues are one of the primary reasons for failed data collection jobs, the upfront connection checking step allows the system to identify these issues early in the collection process and allocate data collection resources more efficiently.

In another respect, embodiments of the DDMS may implement the data collection process by storing data collection query results to external files and loading these files using worker nodes into the metadata store. In some embodiments, the technique avoids write condition in the metadata store, where the data collection results may be returned in a sharp burst. In some embodiments, the loading of the files may be performed in a more coordinated fashion, so as to not cause any undesirable activity spikes in the metadata store. In some embodiments, the DDMS may more easily perform data transformation or normalization on the results files, before loading the data into the metadata store.

In another respect, embodiments of the DDMS may provide a rich set of graphical user interfaces (GUIs) to allow users to easily view and navigate the collected data from the databases. In some embodiments, these GUIs may provide interactive user interface elements (e.g. links) that allow users navigate from one view to another in an easy and intuitive manner. In some embodiments, the visualization system may be used to generate a database dependency graph that indicates the various data dependencies between the databases or even the individual database objects. In some embodiments, the elements in the dependency graphs may also be interactive to, for example, allow a user to click on the element to view additional information about the element. In some embodiments, clicking a database in the graph allows a user to view detailed information about the database. In some embodiments, clicking or hovering on an edge (a data dependency) in the graph allows a user view a list of database objects that are part of the data dependency.

As may be readily appreciated by those skilled in the art, the DDMS system described herein introduces a number of novel features that improve upon the functioning of database data collection and visualization systems. These and other benefits and features of the DDMS system are discussed in further detail below, in connection with the figures.

FIG. 1 is a block diagram illustrating an example database dependency monitoring system (DDMS) that collects activity data from databases in an inventory and generates a database dependency graph from the activity data, according to some embodiments.

Embodiments of the DDMS 100, as shown, may be implemented on one or more computer systems, for example, a network of connected compute nodes. As shown, the DDMS 100 may be configured to interface with clients 110, which may comprise clients that can access the DDMS 100 over a network such as the Internet. As shown, in some embodiments, DDMS 110 may be organized into two or more subsystems, including the database metadata visualization system 120 and the database activity data collection system 130, which may be able to execute independently from one another. In some embodiments, the two subsystems 120 and 130 may be implemented as a single system.

As shown, the database activity data collection system 130 may be implemented using a metadata store 140. The data collection system 130 may be programmed to operate over or monitor the activity of a set of databases (e.g. database 160) indicated in an inventory 132 of the databases. In some embodiments, the inventory 132 may not be implemented as part of the data collection system 130 or the DDMS 100, but an external database that is accessed by the DDMS 100 or data collection system 130. In some embodiments, the inventory of databases 132 may represent a list of databases that are maintained by a particular company. In some embodiments, the inventory 132 may represent a set of databases that are to be migrated to a new database management system (e.g. a database system in a network-accessible service provide network). In some embodiments, the databases 160 indicated in the inventory 132 may represent databases 162*a-d* that are managed by different owners or organizations within a company. Some of these databases 162 may have data dependencies on one another, for example, in the form of database links, cross-database materialized views, database-specific applications that draw from other databases, or data feeds (e.g. ongoing extract-transform-load or ETL jobs), etc. Depending on the embodiment, a data dependency may be implemented using a number of different data sharing mechanisms, so that the disappearance or deprecation of a producer database will impair the content or operation of a consumer database.

As shown, the data collection system 130 may implement a number of modules (e.g. connection checker 150, activity data collector 152, and activity data loader 158) to collect activity data from the inventory of databases, and place the collected activity data in a metadata store 140. In some embodiments, the collection process may be repeated, for example, periodically. In some embodiments, the metadata store 140 may store a history of the collected activity data from the databases 160.

As show, the connection checker 150 may periodically check 151 connectivity to each of the databases 162 in the inventory. In some embodiments, this connection checking or verification is performed separately from the actual data collection from the individual databases. This is done so that database collection process can programmatically cope with changes in the databases 160, for example, when a database 162 is removed or deprecated from the inventory, or when a database 162 is brought down for a period of time for some reason (e.g. to perform maintenance or an upgrade). By checking the connection to the databases ahead of the data collections, the system 130 can automatically detect when a database is not accessible, and accordingly skip any subsequent steps or cycles of data collection (e.g. performed by activity data collector 152). In this manner, resources may be more efficiently allocated for the data collection step.

As shown, in some embodiments, the results of the connection checking may be stored in a database object in the metadata store 140, for example, an available database catalog 142. In some embodiments, the metadata store 140 may be one or more instances of a relational database, and the catalog 142 may be implemented as a table, which may be updated and queried using Structured Query Language (SQL). In some embodiments, the catalog 142 may indicate, for each verification check (which may be done periodically), a list of available databases that the connection check 150 was able to establish connection to. In some embodiments, the catalog 142 may be stored in the same database 140 as the activity data 144 that will be later collected. In some embodiments, the catalog of available databases 142 may be stored in a separate data store.

In some embodiments, to check the connectivity of a database 162, the connection checker 150 may first look for a set of access credentials for the database. In some embodiments, this access credential information may be stored in the database inventory 132, or some other data store such as a company-wide key store or identity and access management (IAM) system. In some embodiments, if no access credentials are found for a database 162, the connection check may be deemed a failure, and this result may be logged in the metadata store 140 (e.g., as a record in the catalog 142). In some embodiments, the connection checker 150 may discover multiple access credentials for a database 162. In such embodiments, the connection checker 150 may attempt to connect to the database 162 by trying individual ones of the multiple access credentials. In some embodiments, the access credentials used to make the connection attempts may be selected in a particular order, which may be dictated by a policy specified for the connection checker 150. In some embodiments, when the connection checker 150 determines that one access credential can be used to successfully connect to the database 162, no further connection attempts (using other credentials) are made. In some embodiments, an indicator for the successful access credential may be stored as part of the results of the connection check (e.g. in the catalog 142), so that this successful access credential can be used by the activity data collector 152 to perform the activity data collection.

In some embodiments, the connection checker 150 may perform some rudimentary metadata collection about the database 162, in addition to the connection check. These rudimentary metadata collections may collect data that can be easily collected about a database 162, which can be easily piggybacked on a connection check operation. For example, in some embodiments, the connection checker 150 may determine for each available database whether it is a primary database instance or a standby database instance. In some embodiments, a database 162 may actually be composed of multiple instances, which may mirror each other and be maintained to make the database highly available. In some embodiments, the primary database instance may be a writable or updatable instance, while the standby instances are read-only replicas of the primary instance. In some embodiments, when the primary instance fails, the database system may automatically switch in a standby instance to be the new primary instance. In some embodiments, the role of the primary instance may be dynamically rotated among a group of database instances. In some embodiments, this dynamic role of the database instance (e.g. whether the instance is a primary or standby instance) may also be captured by the connection checker 150, and recorded in the metadata store 140.

As shown, in some embodiments, the collection of the activity data 153 may be performed by the activity data collector component 152. As with the connection checker 150, the activity data collector 152 may be executed periodically to gather the activity data from each of the databases 162 that were deemed to be available by the connection checker, as indicated in the catalog 142. In some embodiments, the collection of the activity data may be performed on a more frequent basis than the checking or verification of the connectivity. For example, in some embodiments, the connection checker 150 may be executed once a day for the inventory, while the activity data collector 152 may be executed multiple times a day. In some embodiments, if the activity data collector 152 discovers a connection problem to a database 162, it may alter or add to the data in the catalog 142, so that subsequent data collection executions can be aware of the connection problem and adjust accordingly.

In some embodiments, the activity data collector 152 may connect to the available databases 162 and execute queries in these databases to generate query results that indicate the activity data. In some embodiments, the query results may be stored in output files 156, which may be external to the databases 162. In some embodiments, the queries may include various metadata states of the database 162, which may change over time. Such metadata state data may include for example the various types of database objects that are defined in each database, the size of the database, the logons to each database, etc. Additionally, the collected activity data may also include different types of database operations, requests, or statements (e.g. SQL statements) that are were executed by the database in the previous period. In some embodiments, this information may be maintained by the database system managing the individual databases 162. In some embodiments, the queries may also collect information such as the number of executions performed for each database statement. In some embodiments, the queries may also collect the different executors (e.g. the users, applications, etc.) that are issued each execution of a database statement. In some embodiments, the queries may also collect the database objects that were read or written by individual executions of the database statements. All of this information produced by the queries may be stored 154 in a normalized form, for example, as Javascript Object Notation (JSON) objects, in the output files 156.

In some embodiments, the querying may be performed using queries that are designed to have little or no performance impact on the individual databases 162. For example, in some embodiments, the queries themselves may not leave behind any intermediate data in the databases. In some embodiments, the queries themselves may be optimized to execute in a very efficient manner on the databases. In some embodiments, particular queries may be executed with custom execution plans for different types of databases 162. For example, in a high tier database that is being heavily used, the data collection queries may be executed according to an execution plan that may complete slower but cause less resource contention in that database. In some embodiments, the data collections may be scheduled during particular time windows where the database is traditionally less busy.

In some embodiments, in order to further reduce the impact of the data collection queries, an identifier for individual database statements that were observed for a database may be cached from one collection operation to the next. In some embodiments, these identifiers may uniquely identify a particular database statement (e.g. by hashing the text or parameters of that statement). In some embodiments, certain data about a database statement may remain static over multiple collection periods. Thus, this static data does not need to be collected for every collection operation. Accordingly, in some embodiments, the activity data collector 152 may check whether a current set of database statements seen a database have been previously seen, according to their statement identifiers. If so, the previously collected static data for those statements may be used, and such static data need not be re-queried or processed in the current collection operation, thereby reducing resource usage of the data collection operation.

As shown, in some embodiments, the data collection system 130 may implement an activity data loader module 158, which may be tasked with reading the output files 156, transforming the data in the output files, and loading 159 the data to the metadata store 140. As discussed, in some embodiments, by storing this collected activity data to intermediate files, the data collection system 130 can reduce contention to the metadata store 140, which may not be able to handle incoming activity data for a large number of databases 162 at the same time. As shown, in some embodiments, the data may be loaded into a database object, such as one or more activity data tables 144 in the metadata store. In some embodiments, these database objects may be used to store all historical activity data collected by the activity data collector 152. In some embodiments, the schema of the activity data 144 may be defined so that it can easily receive the data in the output files 156 and be used to easily determine any data dependencies between the various databases 162. In some embodiments, the loader 158 may be executed periodically to follow after the executions of the collector 152. In some embodiments, multiple data loaders 158 may execute at approximately the same time (e.g. for multiple sets of output files 156), and these executions may be coordinated (e.g. queued) so that they do not overwhelm the metadata store 140 (e.g. to keep the number of connections to the metadata store below a limit).

As shown, in some embodiments, the metadata store 140 may be replicated or copied to another metadata store 122, which may be a read-only copy of some or all of the data in the metadata store 140. In some embodiments, this copying is done so that the database metadata virtualization system 120 does not operate over the authoritative metadata store 140, which is constantly being updated. In some embodiments, the replication allows the data in the metadata store 140 to be used by a large number of clients and visualization systems, subject to a small replication delay. In some embodiments, the metadata store 122 may implement its own optimizations (e.g. database indexes) to allow for custom and faster querying of the activity data.

In some embodiments, the visualization system 120 may implement a set of graphical user interfaces 124 that allow users to view the activity data of the databases 160. In some embodiments, the visualization system 120 may be implemented as a web server, which can generate webpages that can be displayed by clients 110 using web browsers. In some embodiments, part of the data that is presented in the GUIs may include a database dependency graph 126. In some embodiments, the data dependency graph may include nodes that represent individual ones of the databases 162, and directed edges that represent individual data dependencies between the databases. In some embodiments, two databases may have a bi-directional dependency, where a first database depends on the second database for some portion of the first database's data, and the second database depends on the first database for some other portion of the second database's data. In some embodiments, the database dependency graph 126 may be generated for a particular database 162, for a particular one or set of database objects, or globally for all objects and all databases in the inventory 132. In some embodiments, the databases or the dependencies in the graph may be color coded or otherwise marked to show their activity level or the degree of their dependency. In some embodiments, the elements in the dependency graph (e.g. the databases or the dependencies) may be selected to reveal additional information about those elements in the graph. Accordingly, by generating the data dependency graph 126, a user can easily visualize the dependency relationships among the databases in the inventory, based on actual activity data collected from the databases.

Figure 2A:
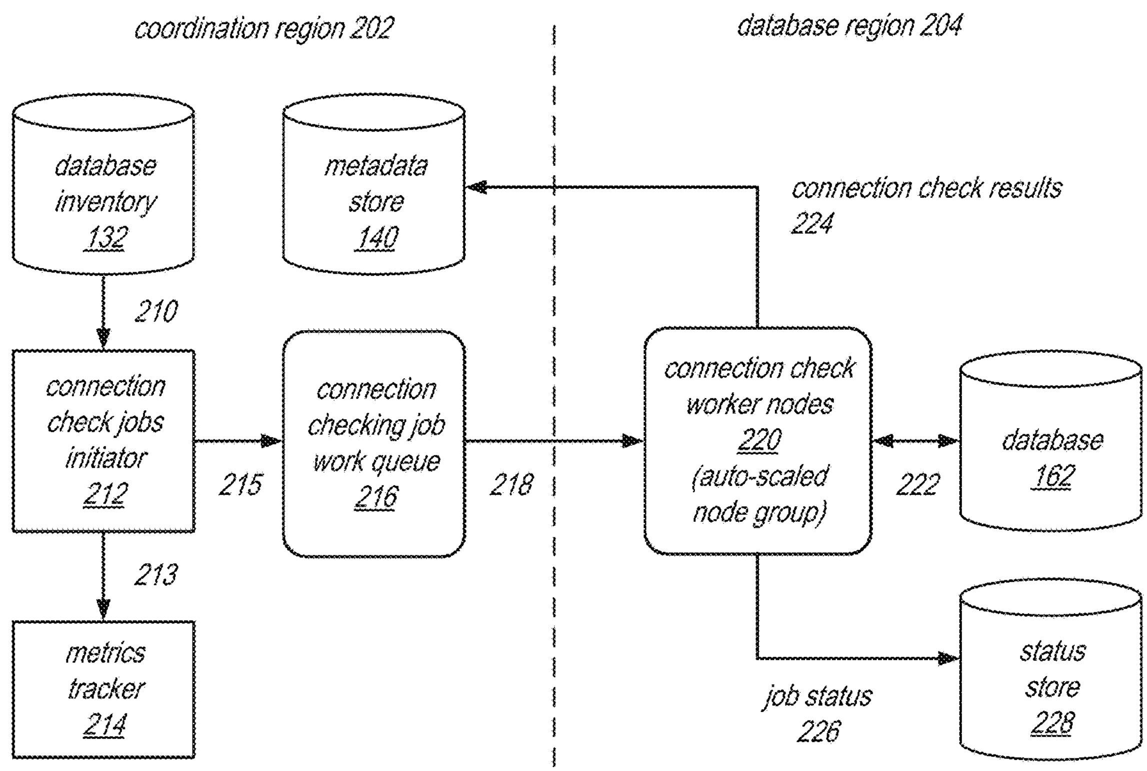
FIGS. 2A and 2B illustrate components in a DDMS that implement connection checking and data collection operations as scalable jobs, according to some embodiments.
Figure 2B:
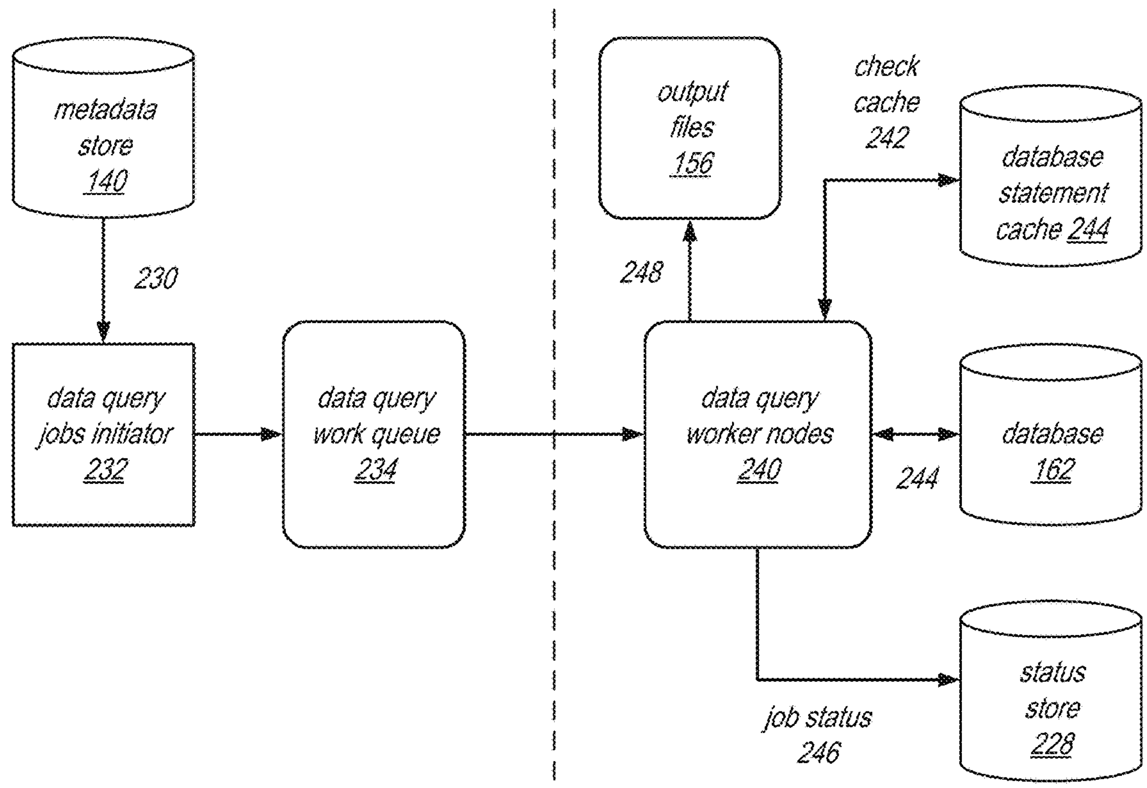

FIGS. 2A and 2B illustrate components in a DDMS that implement connection checking and data collection operations as scalable jobs, according to some embodiments.

FIG. 2A illustrates system components that implement a connection checking operation in a DDMS, such as the DDMS 100 of FIG. 1. In some embodiments, the components shown in the figure may be implemented as part of the connection checker 150 of FIG. 1.

As shown, in some embodiments, the connection checking may be performed by initiating a number of connection check jobs, which are queued, received by individual worker nodes, and executed on individual databases 162. In some embodiments, as shown, the components may span across multiple regions, including a coordination region 202 where the connection check jobs are created, and one or more database regions 204 where the target databases 162 reside. In some embodiments, the two different regions 202 and 204 may represent different physical locations, data centers, local area networks, or regions or availability zones within a wider service provider network. In some embodiments, the database region 204 may represent a client-premises, which may include an inventory of databases that are undergoing migration. In some embodiments, there may be many different database regions 204 for many different clients, which may all be monitored by the DDMS at a centralized coordination region 202. Accordingly, the DDMS may act as a centralized orchestrator to perform database monitoring and activity data collection for different databases at a large number of different regions.

As shown, in some embodiments, a connection check job initiator component 212 first initiate the various connection check jobs. In some embodiments, each individual connection job may correspond to one database instance, which may reside on a particular database server. In some embodiments, the list of databases may be retrieved 210 from the database inventory 132, which may describe the database instances and their corresponding servers. In some embodiments, the database inventory 132 may also indicate the access credentials to use to attempt connection.

In some embodiments, the connection check job initiator 212 may create the jobs for each of the databases, and place those jobs 215 on a connection checking job work queue 216. As shown, the job queue 216 may span multiple regions (e.g. regions 202 and 204) so that the jobs will be transmitted 218 to the database region 204 to be retrieved by worker nodes 220 in that region. In some embodiments, one work queue 216 may be consumed in multiple remote regions. In some embodiments, the initiator 212 may place the jobs in multiple work queues 216 that correspond to multiple different regions. In some embodiments, the initiator 212 may be configured to generate these jobs on a regular basis, for example, once a day. In some embodiments, the jobs may be generated based on the occurrence of certain events. In some embodiments, the jobs may be generated according to a rule-based schedule, which may be configurable by an administrator. For example, in some embodiments, the initiator 212 may be configured via a configuration module to generate the checking jobs for certain high volume databases more frequently, or to slow down or stop these jobs during certain peak demand periods.

As shown, in some embodiments, initiator 212 may generate 213 metrics, which may be sent to and captured by a metrics tracker 214. In some embodiments, the metrics may include for example counts of the jobs that were initiated, the times that the jobs were queued, etc.

As shown, in some embodiments, at the database region 204, an auto-scaled node group of worker nodes is implemented to handle the jobs that are transmitted via the work queue 216. In some embodiments, the group of worker nodes may be implemented as virtual machine instances, which may be automatically provisioned or deprovisioned based on demand (e.g. the amount of jobs in the job queue). In some embodiments, the number of worker nodes in the group may be automatically managed, to grow or shrink according to the amount of jobs delivered to the node group.

As shown, in some embodiments, individual nodes in the group 220 may retrieve an individual connection check job, and attempt to connect 222 to a database 162 according to the job specification. In some embodiments, the connection check job may attempt to retrieve a set of access credentials for the database 162. In some embodiments, the connection job may try to connect to the database using individual ones of the access credentials, until a successful connection is established. In some embodiments, when a connection is successfully established, the worker node may associate the successful access credential along with the connection check result, and send the result 224 back to the coordination region 202 to be stored in the metadata store 140. In some embodiments, if a connection to the database cannot be successfully established, that is indicated in the connection check results and stored in the metadata store. In some embodiments, the worker nodes may be configured to write directly to the metadata store 140. In some embodiments, the worker nodes may communicate with an intermediate component (e.g. the job initiator 212), in order to write the results to the metadata store.

In some embodiments, in addition to the connection check itself, the job may also include gathering some rudimentary metadata info about the database instance 162. In some embodiments, such information may include things such as the number of logons to the database in the past period, the amount of storage space used by the database instance, or whether the database instance is currently acting as a primary instance or a standby instance, among other information.

As shown, in some embodiments, some metrics or status 226 of the job executions may be stored to a status store 228 in the database region. In some embodiments, such metrics or status information may include data such as the time of the connection check, the length of time it took to complete the check, etc. In some embodiments, the status information may be included as part of the connection check results 224 and sent back to the metadata store 140. In some embodiments, both the connection check results and jobs status information 226 may be first stored locally at the database region 204, and asynchronously transmitted back to the coordination region 202 to be stored. In this manner, the connection check results from all databases 162 are not written to the metadata store 140 at the same time.

FIG. 2B illustrates system components that implement a data collection operation in a DDMS, such as the DDMS 100 of FIG. 1. In some embodiments, the components shown in the figure may be implemented as part of the activity data collector 152 of FIG. 1.

As shown, in some embodiments, the components may include a data query jobs initiator 232. Like the connection check jobs initiator 212, the data query jobs initiator will create a number of query jobs for individual ones of the databases 162, and add these data query jobs to a work queue 234. In some embodiments, the list of data query jobs is created from the available database catalog 142 in the metadata store 140, which indicate those databases 162 whose connectivity were recently verified by the connection checker 150. As with the connection check jobs initiator 212, the data query jobs may be generated according to a set schedule, based on an event-driven policy, or both. In some embodiments, the scheduling of these data query jobs may be configurable by an administrator, which may specify various rules or conditions that control how frequently or whether the data query jobs should be initiated.

As shown, the data query work queue 234 transmits the data query jobs created by the initiator 232 to the database region, where an auto-scaled group of data query worker nodes 240 is implemented to retrieve the jobs from the queue and perform 244 the data query jobs on individual databases 162. In some embodiments, the worker nodes may connect to the databases using access credentials that were previously verified by the connection checker 150, and run the database queries to collect activity data of the databases. In some embodiments, the collection may be performed using a series of queries against metadata tables in the databases 162, which may be transformed, normalized, and stored 248 as a set of output files 156. As discussed, in some embodiments, the output files 156 may be used to load the activity data back to the metadata store 140. In some embodiments, the activity data may be provided back to the metadata store 140 using a different mechanism other than intermediate files.

In some embodiments, the data queries may be written so that they cause no or little impact on the performance of the databases 162, which may be operating production database instances. In some embodiments, the worker nodes 240 may schedule the data collection jobs (e.g. wait for a particular time to execute the queries) for a time when the databases 162 are expected to be experiencing low demand or relatively idle.

In some embodiments, to further reduce the impact of the data collection jobs, the worker nodes may maintain a cache of execution statement identifiers from one collection job to the next. In some embodiments, a unique identifier for a database statement seen in the database 162 may be generated, and cached in a database statement cache 244, as shown. In some embodiments, subsequent worker nodes that attempt to collect data from the database may check 242 the cache to determine a set of database statements that were previously seen for that database. For these previously-seen database statements, the worker node may refrain from gathering certain static information about those statements, which are not expected to change over time. In this manner, certain portions of the data query job may be skipped, thereby further reducing the impact of these jobs.

As shown, in some embodiments, a status store 228 may be implemented at the database region to capture certain job status information 246 for each job execution. In some embodiments, this job information may also be fed back to the metadata store 140, so an administrator of the data collection process may examine the status or execution history of the data collection jobs. In some embodiments, the status information 246 may be included in the output files 156 to be loaded to the metadata store 140.

Figure 3:
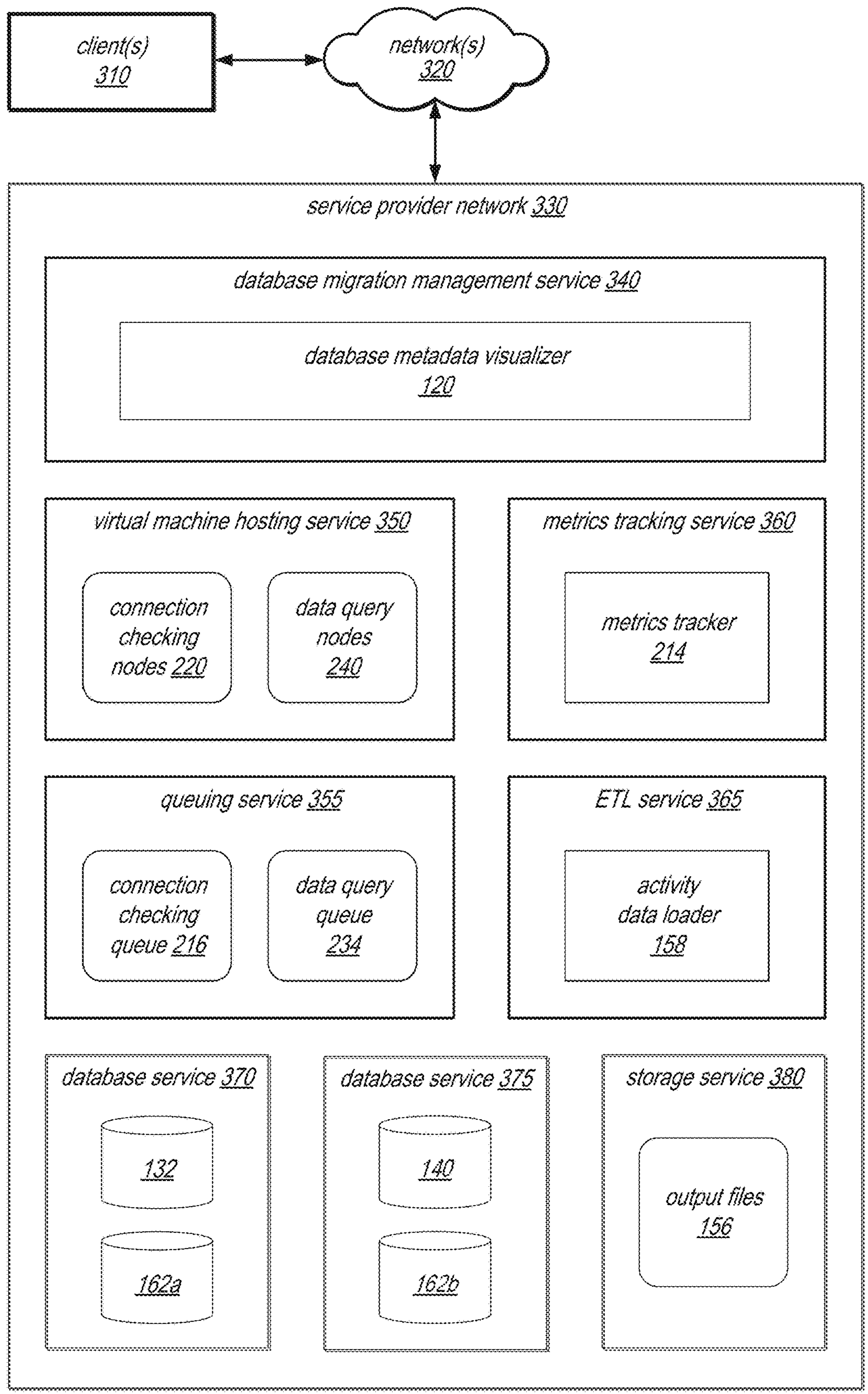
FIG. 3 depicts a network-accessible service provider network that provide different types of services that can be used to implement a DDMS, according to some embodiments.

FIG. 3 depicts a network-accessible service provider network that provide different types of services that can be used to implement a DDMS, according to some embodiments. As shown, in some embodiments, various components of the DDMS (e.g. DDMS 100 of FIG. 1) may be implemented as services provided by a service provider network 330. In some embodiments, the service provider network 330 may be a network-accessible, multi-tenant service provider system that is accessible via networks 320 by clients 310.

In some embodiments, the service provider network hosting the components may provide computing resources via one or more computing services to the client(s) 310. The service provider network and the hosted components may be operated by an entity to provide one or more services, such as various types of network-accessible computing or storage services, accessible via the Internet and/or other networks to client(s). In some embodiments, the service provider network or CDMS may implement a web server, for example hosting an e-commerce website. The service provider network may include numerous data centers hosting various resource pools, such as collections of physical and/or virtualized computer servers, storage devices, networking equipment and the like, needed to implement and distribute the infrastructure and services offered by the service provider network. In some embodiments, the service provider network may provide computing resources to clients. These computing resources may in some embodiments be offered to client(s) in units called "instances," such as virtual compute instances.

The client(s) 310 may encompass any type of client configurable to submit requests to the service provider network 330. In some embodiments, the clients 310 may be the clients 110, as discussed in connection with FIG. 1. In some embodiments, a given client 310 may include a suitable version of a web browser or may include a plug-in module or other type of code module configured to execute as an extension to or within an execution environment provided by a web browser. Alternatively, a client 310 may encompass a client application such as a dashboard application (or user interface thereof), a media application, an office application or any other application that may make use of the computing resources to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, client(s) 310 may be configured to generate network-based services requests according to a Representational State Transfer (REST)-style network-based services architecture, a document- or message-based network-based services architecture, or another suitable network-based services architecture. In some embodiments, the service provider network or the DDMS components may offer their services as web services, and the client(s) 310 may invoke the web services via published interfaces for the web services. In some embodiments, a client 310 (e.g., a computational client) may be configured to provide access to certain aspects of the DDMS in a manner that is transparent to applications implemented on the client(s) 310 utilizing computational resources provided by the service provider network.

In various embodiments, the network(s) 320 may encompass any suitable combination of networking hardware and protocols necessary to establish network-based communications between clients 310 and service provider network 330. For example, a network 320 may generally encompass the various telecommunications networks and service providers that collectively implement the Internet. A network 320 may also include private networks such as local area networks (LANs) or wide area networks (WANs) as well as public or private wireless networks. For example, both a client 310 and the service provider network 330 may be respectively provisioned within enterprises having their own internal networks. In such embodiments, the network 320 may include the hardware (e.g., modems, routers, switches, load balancers, proxy servers, etc.) and software (e.g., protocol stacks, accounting software, firewall/security software, etc.) necessary to establish a networking link between the client 310 and the Internet as well as between the Internet and service provider network. In some embodiments, client(s) 310 may communicate with service provider network or DDMS using a private network rather than the public Internet.

As shown, in some embodiments, the service provider network 330 may provide a number of services to implement components of the DDMS. In some embodiments, these services may be implemented using in-the-cloud hardware resources operated by the service provider network, so that clients 310 of the service provider network need not maintain their own dedicated hardware for these components.

As shown, in some embodiments, a database migration management service 340 may be implemented. In some embodiments, this service 340 may be used by different clients to manage the migration of databases from one type of database system or operating environment to another type of database system or operating environment. In some embodiments, the migration management service 340 may be used to migrate legacy databases for clients to network-accessible database services offered by the service provider network. In some embodiments, the database migration service 340 may be able to monitor not just the databases hosted in the service provider network, but also databases at remote regions or locations, for example, the databases at different client premises that are designated for migration. In some embodiments, the database inventory may be loaded with client-side databases and associated access credentials to allow the migration service 340 to monitor the activity in those databases. As shown, in some embodiments, the database migration management service may implement the database metadata visualization system 120 as discussed in connection with FIG. 1. In some embodiments, the visualization system may generate GUIs (e.g. database dependency graphs 126) to allow a user to better understand the dependencies of the databases that are being migrated, so as to better plan and implement stages in the migration process.

As shown, in some embodiments, a virtual machine provisioning or hosting service 350 may be provided. In some embodiments, this type of service may be configured to create, configure, manage, and host virtual machines to host custom applications for clients. In some embodiments, the service 350 may create dedicated instances of virtual machines that are maintained to execute client applications. In some embodiments, the service 350 may be provided in a serverless manner, where nodes are selected and prepared in response to incoming execution requests. In some embodiments, the service 350 may be used to implement auto-scaled groups of nodes, where the service manages the size of the group based on observed demand for the group. As shown, in some embodiments, the connection checking nodes 220 and the data query nodes 240 may be implemented using the virtual machine hosting service 350. In some embodiments, the virtual machine hosting service 350 may be the base service used by many other services provided by the service provider network 330.

As shown, in some embodiments, the service provider network may provide a queuing service 355. In some embodiments, the queuing service may be used to create client-defined queues, which may be configured to receive queue messages (e.g. jobs) and delivered to messages to be consumed elsewhere in the service provider network. In some embodiments, the hosted queue may be implemented using virtual machines provided by the virtual machine hosting service 350. As shown, in some embodiments, the connection checking work queue 216 and the data query work queue 234 may be implemented using the queuing service 355, in some embodiments.

As shown, in some embodiments, the service provider network may provide a metrics tracking service 360. In some embodiments, this service 360 may be used to receive, track, and provide operational metrics from a variety of services in the service provider network. In some embodiments, the metrics tracking service 360 may provide interfaces to allow services to store operational metrics and programmatically provide the metrics to other services. In some embodiments, as shown, the metrics tracker 214 may be implemented using the metrics tracking service 360.

As shown, in some embodiments, the service provider network may implement an extract-transform-load (ETL) service 365, which may provide a variety of functions to allow a user to extract data from a database or load data into a database. In some embodiments, the ETL service 365 may be configured to work tightly with the database services offered by the service provider network. In some embodiments, as shown, the activity data loader 158 may be implemented using the ETL service 365.

As shown, in some embodiments, the service provider network may implement multiple types of database services 370 and 375. In some embodiments, these database services may provide different interfaces to create and remove database objects, update data, query data, and perform other types of database operations. In some embodiments, a database service 370 or 375 may implement a relational database service to host relational databases. In some embodiments, a database service 370 or 375 may implement a non-relational database. In some embodiments, a database service may be implemented so that a hosted database can scale with no or little manual supervision. As shown, the different data stores discussed previously, such as the database inventory 132, metadata store 140, and monitored databases **162*a* and 162*b*, may be implemented on top of these database services 370 and 375. In some embodiments, the database migration management service 340 may be configured to interact with all these types of database services 370 and 375, as well as external database systems, to implement the migration of databases such as databases 162*a* and 162*b***.

As shown, in some embodiments, the service provider network may implement other types of data storage services such as storage service 380. In some embodiments, these storage services may implement simple read/write interfaces, which may implement data access operations such as key-value access, block-based access, file-based access, among others. In some embodiments, the storage service 380 may allow users to store uniquely named data objects or "buckets" of data in storage allocated to the users. In some embodiments, as shown, the output files 156 discussed previously may be stored using the storage service 380.

As may be appreciated by those skilled in the art, the illustrated use of the services in this figure are presented as mere examples. Depending on the embodiments, different types of services may be implemented, and different services may be used to implement the components of the DDMS, without departing from the spirit of the disclosures presented herein.

FIG. 4 depicts an example output file that includes some activity data collected by the DDMS, according to some embodiments. As shown, in some embodiments, the output file shown may be an example (or a portion) of the output file 156 as discussed in FIG. 1.

As shown, in some embodiments, the output file 156 may be stored in a standard formatted as the JSON format. In this example, the JSON format is used to represent an object structure, which is built from the activity data queries executed in the databases 162. As shown, in this example, the output file 156 specifies an object for a database statement 410 that was collected from a database. In this example, the database statement is a SQL statement that performs a full table access on a table "PRODUCTS" owned by "OWNER1," which resides in the database "PRODUCT_DB."

In some embodiments, one output file 156 may be generated for each database instance, and one database statement object may be generated for each type of database statement seen in the database. In some embodiments, each database statement object 410 may have one or more associated sub-objects or nested objects 420, 425, 430, or 435, which may indicate other data associated with the database statement. As shown in this example, the database statement 410 is associated with a nested object 420, which indicates the "object_info" associated with the underlying database object(s) that are operated on by the database statement. As shown, another type of nested object in this example is the "db_info" object, which indicates certain metadata information about the database instance that includes the database object. As shown, the database statement 410 in this example is associated with two "executor" objects 430 and 435, which may represent users (or applications) that issued the database statement for execution. In this example, each executor 430 and 435 are shown with their respective user names, machines, and modules, which may represent a name or identifier of the application module that issued the database statement. In some embodiments, these attributes of the executor may be mapped to another database instance or system (e.g. via a configurable mapping table), so that an inter-database dependency may be discovered based on this data.

It is noted that while this figure depicts one example object structure collected as part of the activity data, in other embodiments, different types of object structures or output file formats may be used. In some embodiments, the DDMS may be configured to generate different types of output files or object structures for the collected activity data, possibly for different types of database systems.

Figure 5A:
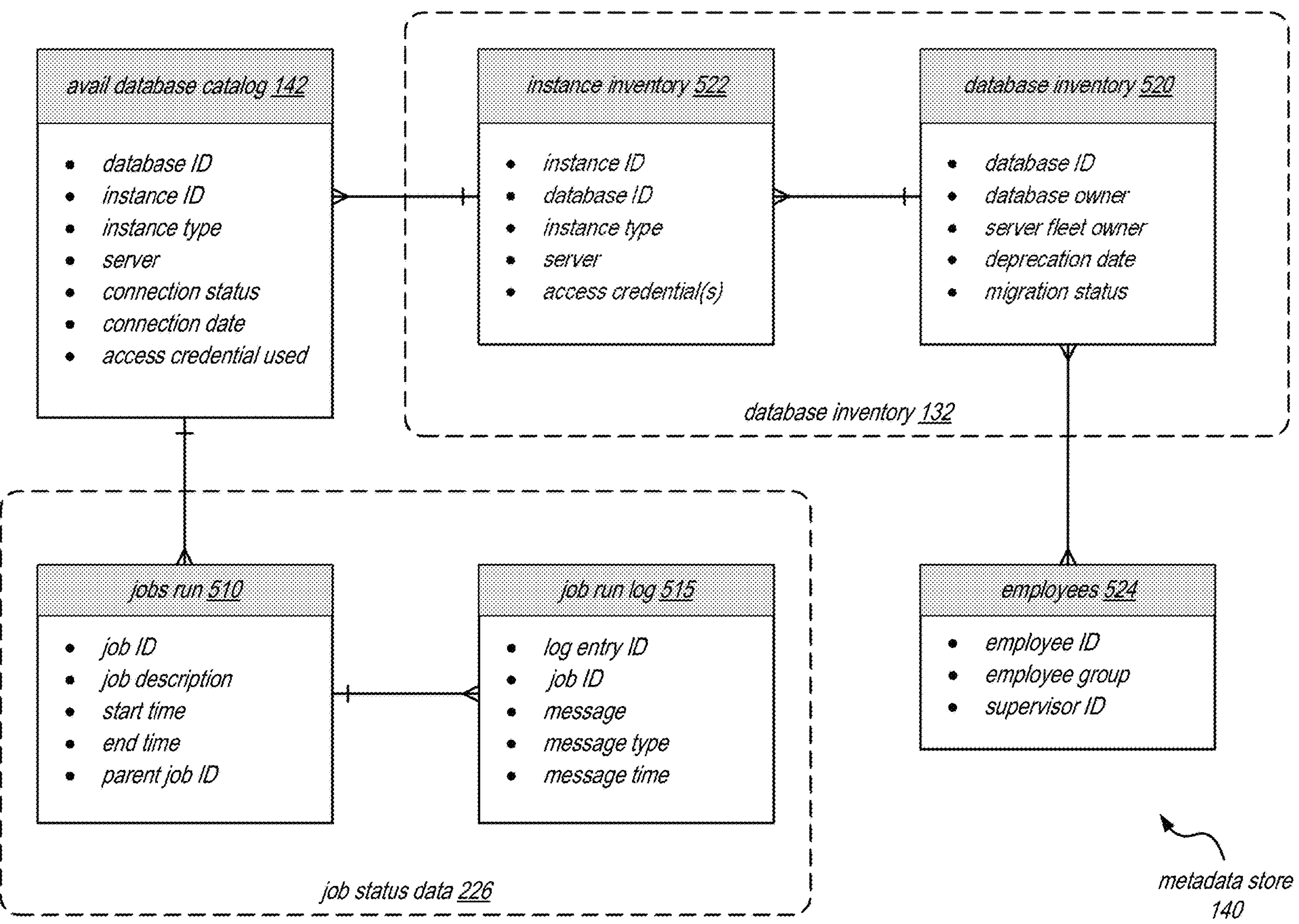
FIGS. 5A and 5B depict portions of an example schema for a metadata store that may be used to store activity data of databases collected by the DDMS, according to some embodiments.
Figure 5B:
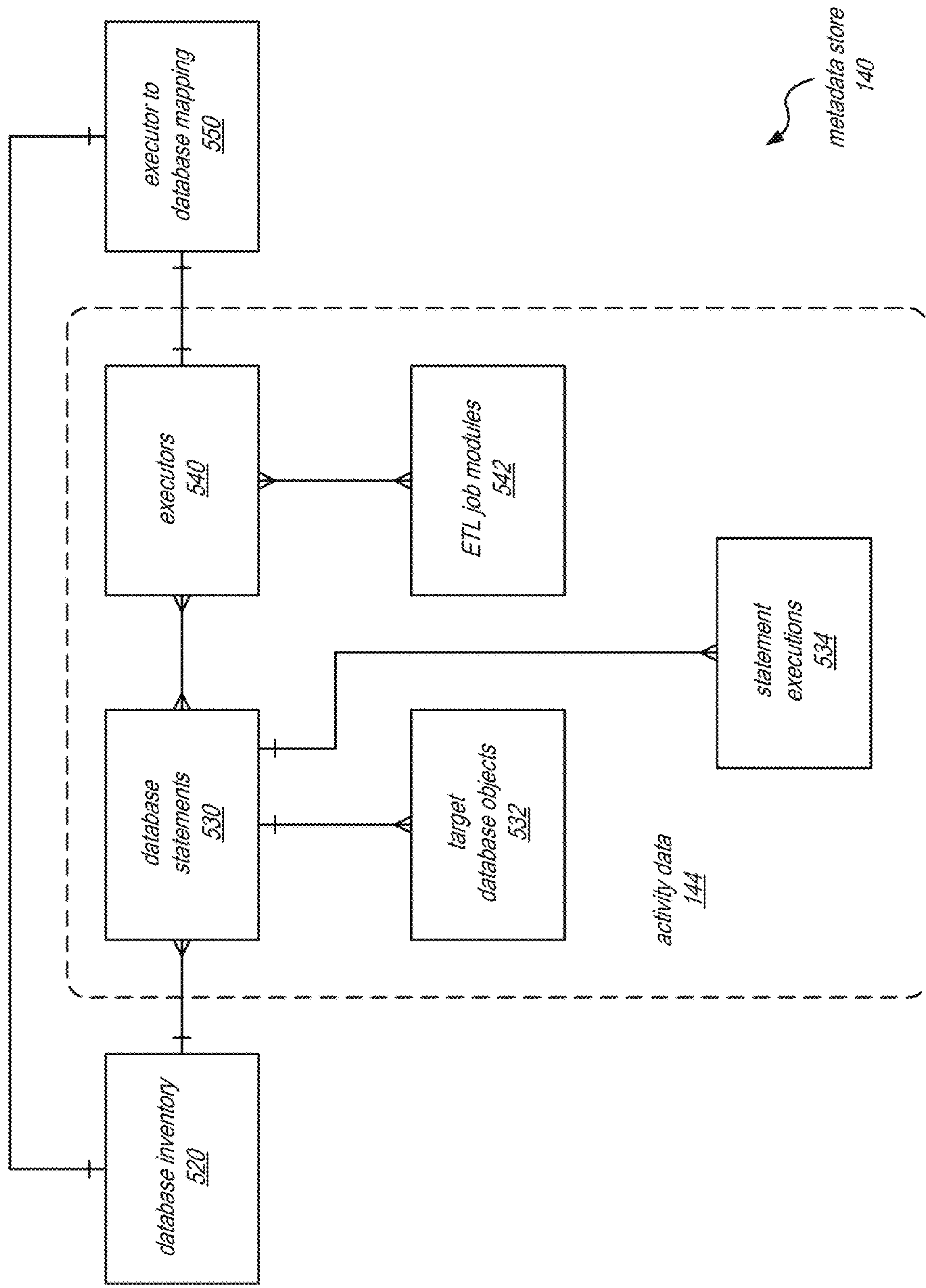

FIGS. 5A and 5B depict portions of an example schema for a metadata store that may be used to store activity data of databases collected by the DDMS, according to some embodiments. In some embodiments, the schema depicted in these figures may be used to define portions of the metadata store 140, as discussed in connection with FIG. 1.

As shown, FIG. 5A depicts one portion of the example schema for the metadata store 140. In some embodiments, the metadata store may be implemented as a relational database, and the schema shown in the figure may represent an entity-relationship or ER diagram. In some embodiments, the blocks shown in the figure may represent individual tables in the metadata store, and the links may represent join relationships in the metadata store. In the figure, the links may be depicted to indicate one-to-many, or many-to-many relationships. However, it is noted that in some embodiments, the join relationship may also be implemented as other types of relationships such as one-to-one, "exactly one," or "zero-or-more" type relationships.

As shown, in this example, the metadata tore implements an available database catalog object or entity 142. In some embodiments, this object may correspond to the available database catalog 142 of FIG. 1. As discussed, in some embodiments, this object may store data that indicate a catalog of available databases to which connections were successful established in a last connection check or verification operation. In some embodiments, the available database catalog 142 may simply store a list of all database instances from the inventory 132, and use one or more attributes to indicate whether these individual databases were successfully connected to. As shown, in this example, the attributes include the connection status, connection date, and access credential used. As discussed, in some embodiments, when a database is successfully connected to during a connection check, the access credentials that were used to make the successful connection may be stored, so that the same credentials can be used to perform the data collection operation.

As shown, in this example, a job runs object 510 may store data about each job run on a database. As shown, there may be multiple job runs for each database in the catalog 142. In some embodiments, each job may correspond to a connection checking job or a data collection job, as described in FIGS. 2A and 2B. In this example, each job record may include attributes such as a job description, a start time, and an end time, which may be capture as part of the metrics data or status data 226 discussed in connection with FIGS. 2A and 2B. In some embodiments, some jobs may be composed into a hierarchy of parent jobs and child jobs (e.g., one data collection job may include a number of sub-jobs). As shown, in this example, this parent-child relationship may be captured using the parent job ID attribute.

As shown, in this example, each job run may include multiple job run log entries, which are stored in the job run log object 515. In this example, each job log entry may indicate a message, a message type, and a message time. For example, a job run log entry may indicate a failure at a particular step in a job, and the reason why the failure occurred. In some embodiments, the job run log entries may be generated as the job status data 226 as discussed in FIGS. 2A and 2B.

As shown, in this example, the data inventory 132 may also be maintained in objects in the metadata store 140. In some embodiments, the contents of these objects 520 and 522 may be copied from an authoritative data source for the inventory of databases, and refreshed periodically to keep up with changes in the authoritative data source. In this example, the data inventory 520 may include records indicating known databases in the inventory. As shown, each database may have attributes such as its owner, its server fleet owner (which may be different from the database owner), a deprecation date, and a migration status. As discussed, in some embodiments, the metadata store may be used to support a database migration management system, and these latter attributes of the database inventory may be used to track and display information in the migration management system.

As shown, in this example, each database in the inventory object 520 may correspond to multiple database instances in the instance inventory object 522. As discussed, in some embodiments, a database may actually be implemented as a group of database instances. In some embodiments, these instances may include one or more primary instances which can be written or updated, and one or more standby instances which are read-only. The standby instances may be replicas or partial-replicas of the primary instances, and may be configured to take over the role of a primary instance in case of a failure of the primary instance. In some embodiments, the connection checking and data collection jobs may be performed on each database instance of each database in the inventory. In this example, the instance inventory object 522 stores instance-specific attributes such as the particular server of the instance and particular access credentials that can be used to access the instance by the DDMS.

As shown, in this example, the metadata store may also include an employees object 524, which may be copied from another authoritative data source and/or periodically refreshed. In some embodiments, this object 524 may indicate information about particular persons or groups within an organization, and may be used as a lookup table to provide more information for attributes in other objects, such as the database owner and fleet owner attributes in the database inventory object 520. As shown, in this example, an owner field may refer to multiple employees, and an employee may be owners for multiple databases or fleets.

As shown, FIG. 5B depicts another portion of the example schema for the metadata store 140. In this figure, for the sake of brevity, the details of the attributes in each of the objects are skipped. As shown, FIG. 5B illustrates a number of database objects that store the activity data 144 collected by the data collection operation, as discussed in connection with FIG. 2B. In some embodiments, these database objects match roughly to the types of objects captured in the output files, as shown in FIG. 4, which are loaded into these objects in the metadata store.

As shown, in this example, the activity data 144 may include database statements that are stored in a database statements object 530. In some embodiments, each database statement may be a unique type of query, insert, update, or delete executed on a database in the database inventory 520. In some embodiments, the database statements may be SQL statements. In some embodiments, different types of database statements that were executed in individual databases in a last time period will be collected by the data collection process.

As shown, in some embodiments, the target database objects 532 of each database statement may be captured, in a target database objects object 534. As shown, in some embodiments, certain metadata about database statement executions may also be captured as part of the activity data 144 in a statement executions object 534. In some embodiments, the information in this object may indicate how many times a particular database statement was executed during a last collection period, how long each execution took, the volume of data that were fetched or modified by each execution of the database statement, etc. In some embodiments, the information in objects 530, 532, and 534 may be used to generate heatmaps, for example, to indicate how heavily used certain objects in the database are, or how much other databases depend on a particular database object. As shown, in this example, each database statement may be associated with multiple target database objects and multiple statement execution records.

As shown, in some embodiments, the activity data 144 may include an executors object 540, which may be used to store executors that issued the database statements 530. In some embodiments, an executor may correspond to a user, an application or execution module, another database, a computer, or some other entity that caused a particular database statement to execute. As shown, in some embodiments, some of the executors 540 may correspond to ETL job modules, which may be used to extract or load data from the database. In some embodiments, these ETL jobs may be used to implement ongoing data link between different databases, and their information may be tracked in the ETL job modules object 542. In some embodiments, the executors stored in the executors object 540 or the ETL job modules object 541 may include the executors 430 and 435 shown in FIG. 4. As shown, in this example, each executor may be associated with multiple database statements, and each database statement may have multiple executors. Additionally, each executor may be associated with multiple ETL jobs, and each ETL job may be associated with multiple executors.

As shown, in some embodiments, an executor to database mapping object 550 is implemented as part of the metadata store 140. In some embodiments, this object or table may provide a mapping that maps certain executors to certain databases. For example, the mapping object 550 may indicate that a particular database user, application ID, or ETL job is associated with another database in the inventory 520. If such a database user, application, or ETL job is seen as an executor in a particular database, this may mean that the database associated with the executor is dependent on the particular database. Accordingly, in some embodiments, this mapping 550 may be used to determine different types of database dependencies. In some embodiments, the mapping object 550 may be populated from other data sources, and/or configurable manually.

FIGS. 6A to 6E depict example graphical user interfaces (GUIs) that provide different views of activity data and other data collected by the DDMS, according to some embodiments. As shown, these figures depict different views in a visualization system, which may be provided or generated by the database metadata visualization system 120, as discussed in connection with FIG. 1. As discussed, in some embodiments, the visualization system may be configured to generate different views of database metadata from a metadata store (e.g. metadata store 122 of FIG. 1), which contain the activity data 144 and database catalog information 142 collected by the database activity data collection system 130, as discussed connection with FIG. 1.

As shown in FIG. 6A, a view database GUI or view 600 is shown. As discussed, in some embodiments, this view 600 may be provided as a web interface, which is generated as one or more webpages by a web server and can be displayed by a web browser. In some embodiments, the view 600 may be non-web-based, and be provided via some other protocol or using a graphical client application.

As shown, in this example, metadata about a single database 610 is shown. In some embodiments, the view 600 may allow users to view metadata about multiple databases at the same time (e.g. two or three databases side-by-side). In some embodiments, the view 600 may be generated to provide aggregate metadata information about a group or databases. In some embodiments, the database metadata visualization system 120 may implement a search function to allow a user to search for one or more databases based on one or more metadata attributes.

As shown, in this example, high level database metadata about the database are shown in the top section 610 of the view 600. In this example, the database metadata includes the name of the database, an owner, and a database group, which may indicate a group of related databases for a particular department, a particular application, etc. The database group information may be determined from, for example, the employees object 542 of FIG. 5A.

The database metadata 610 in this example also indicates certain attributes that relate to a migration of the database. As discussed, in some embodiments, the visualization system may be implemented as part of a database migration management system, which can be used to monitor and control a staged migration of many databases. In this example, the migration-related metadata includes the migration program 612 that this database is a part of, a deprecation date 614, and a current migration status 616. In some embodiments, the migration status 616 may indicate a progress level that is determined based on a migration plan for the database.

As shown, the view 600 in this example also provides a number of tabs that allow a user to view different types of other metadata for the database. Depending on the embodiments, different types of metadata about a database may be viewed via these tabs. In some embodiments, the metadata information may be presented differently, for example, to be navigated in a different manner (e.g. using a landing page with multiple links). In some embodiments, different elements of data in the view may contain links, so that a user can easily navigate from one type of metadata to another type of metadata (or even between database objects or databases) using these links.

In this figure, as shown, the instances tab 620 is selected. Under this tab 620, an instance table 622 is presented, which contains information about the multiple instances that are operating for this database. As discussed, in some embodiments, one database may be implemented using a group of database instances. In some embodiments, these instances may be automatically managed by the database management system. As shown, in this example, the instance table 622 indicates that there are five designated instances for the database. The table 622 indicates that one of the instances is a primary instance, which may be an instance that can be updated by clients, and that the other four instances are standby instances, which may be read-only instances that may step in as the primary instance in the event of a failure. The table 622 also indicates various instance-specific attributes such as the host of each instance, the host type, whether the instance is available, and the last time that connection was established to an instance. In some embodiments, the last two attributes may be determined via a periodic connection check operation, as discussed in connection with FIG. 2A. In some embodiments, the current role of the instances (primary or standby) may also be determined by the connection check operation.

As shown, the instances tab 620 also include other user control elements, such as buttons 624 and 626. In this example, button 624 may allow a user to view the entire connection history of a selected instance, for example, all connection attempts of a check connection jobs over a span of time. In this example, button 626 may allow a user to explicitly attempt a connection to a selected instance. In some embodiments, this may cause the DDMS to immediately initiate a check connection job to the selected database instance, and update the database instance's availability status accordingly.

As shown in FIG. 6B, another tab 630 is selected. In this tab 630, which depicts metadata information about database objects in the database, a user may view different metadata attributes of the objects, including the activity data collected by the DDMS.

As shown, in this example, an objects table 632 is displayed, which depicts various object attributes about a list of database objects. As shown in this example, the list of objects is filtered or constrained to be only materialized view objects. In some embodiments, materialized view objects may be objects that copy data from another database object, to present a different or a local view of the other database object. In some embodiments, the database management system may automatically refresh the materialized view to reflect changes in the source database object. In some embodiments, a materialized view object may depend on (or copy from) database objects that are in other databases (other than its own database). In some embodiments, these cross-database materialized views may represent a type of data dependency among databases.

As shown, in this example, a list of materialized views is shown in the table 632. In this example, the last four materialized views are cross-database views, which depending on root objects from other databases. In this example, the objects table 632 shows the database link that is used for each materialized view, the root database that is used by the materialized view, and the root object that is used by the materialized view. Additionally, as shown, the table 632 in this example also shows whether the root object has "CRUD," or create, read, update, or delete traffic executed on the root object in a last data collection time period. In addition, the table 632 also shows the number of readers or known dependents on the root object, which may be determined from the collected activity data.

As shown, in this example, the tab 630 also includes a view dependency graph button 634, which may allow a user to generate a dependency graph for the database, or a dependency graph only for the objects (e.g. materialized views) currently shown on the tab. In some embodiments, the button will cause the view 600 to switch to a different table display the dependency graph, for example, tab 670.

Figure 6C:
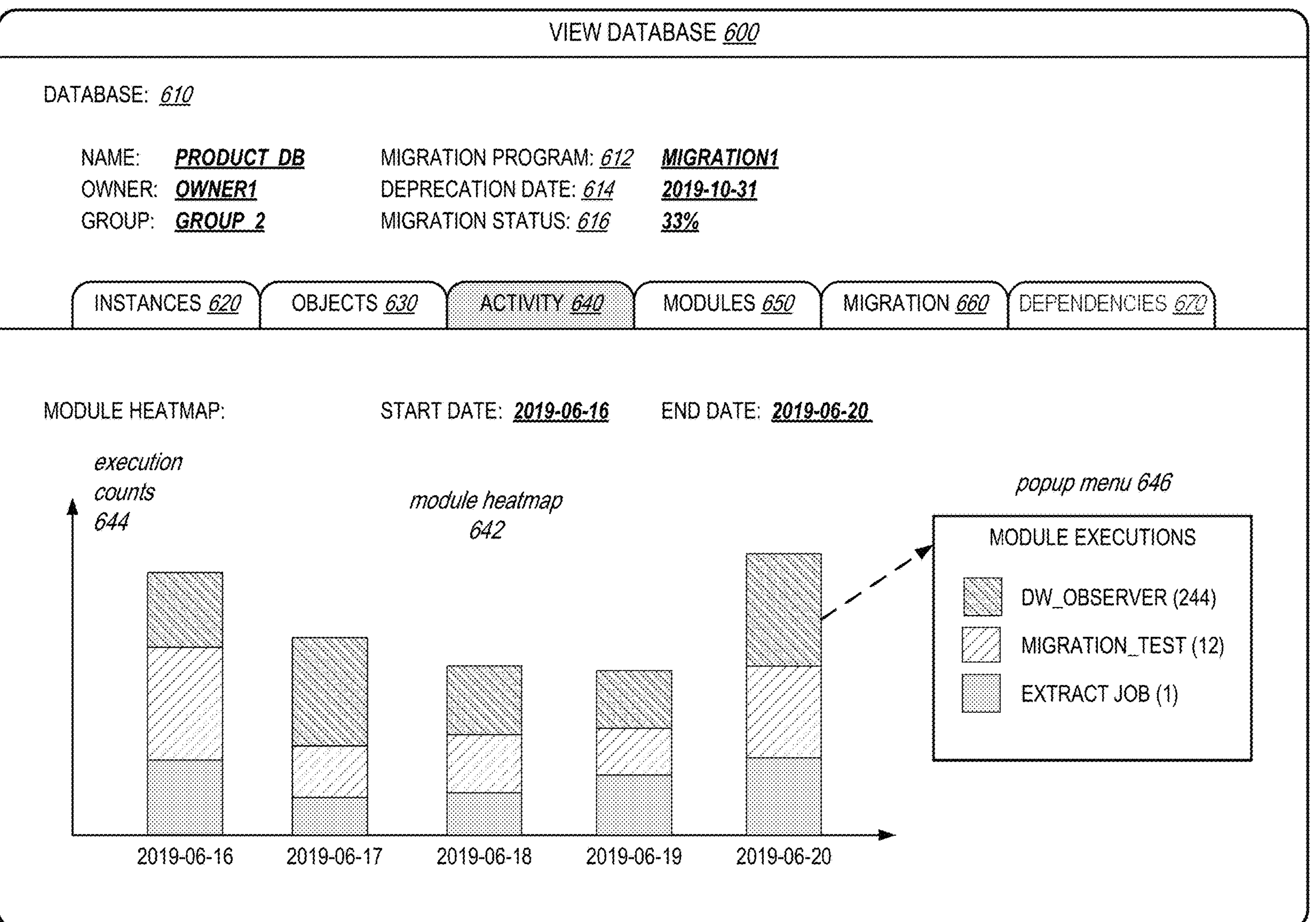

As shown in FIG. 6C, another tab 640 is selected. In this tab 640, which depicts certain activity information about the database, a user may view different presentations of activity data collected by the DDMS.

As shown, in this tab 640, a module heatmap 634 is shown. In this example, the module heatmap 634 shows the execution counts 644 of individual modules or executors seen in the database. As discussed, in some embodiments, the executors and executions of various database statements in the database may be collected by the DDMS. In this example, the module heatmap is configured to display only the execution counts or heatmap data for a particular range of dates. Depending on the embodiment, the tab 640 may allow a user to configure the heatmap graph different, for example, to display the data for only particular modules, only particular database objects, or only particular time ranges, etc.

As shown, in some embodiments, the tab 640 may also generate a graphical legend via a popup menu 646. The graphical legend may indicate the colors or patterns used to depict different kinds of modules whose counts are included in the bar graph, as shown. In some embodiments, the popup menu 646 may be generated via a click on a bar or by hovering the user pointer over a bar. In some embodiments, when a user selects a portion of a bar or a type of module in the legend 646, the GUI may be updated to show metadata details about the selected module or executor, which may be displayed using the modules tab 650.

It is noted that the illustrated example here only depicts one type of presentation for activity data. In other embodiments, other types of activity data presentations may also be provided. As just one example, in some embodiments, the activity tab 640 may provide a "CRUD" graph over time, which displays, for a particular database object or the entire database, the historical counts of create, read, update, and delete operations over a number of successive data collection periods. In some embodiments, the CRUD graph may be generated based on the activity data collected by the DDMS, which may classify database statements according to the categories of create, read, update, and delete.

Figure 6D:
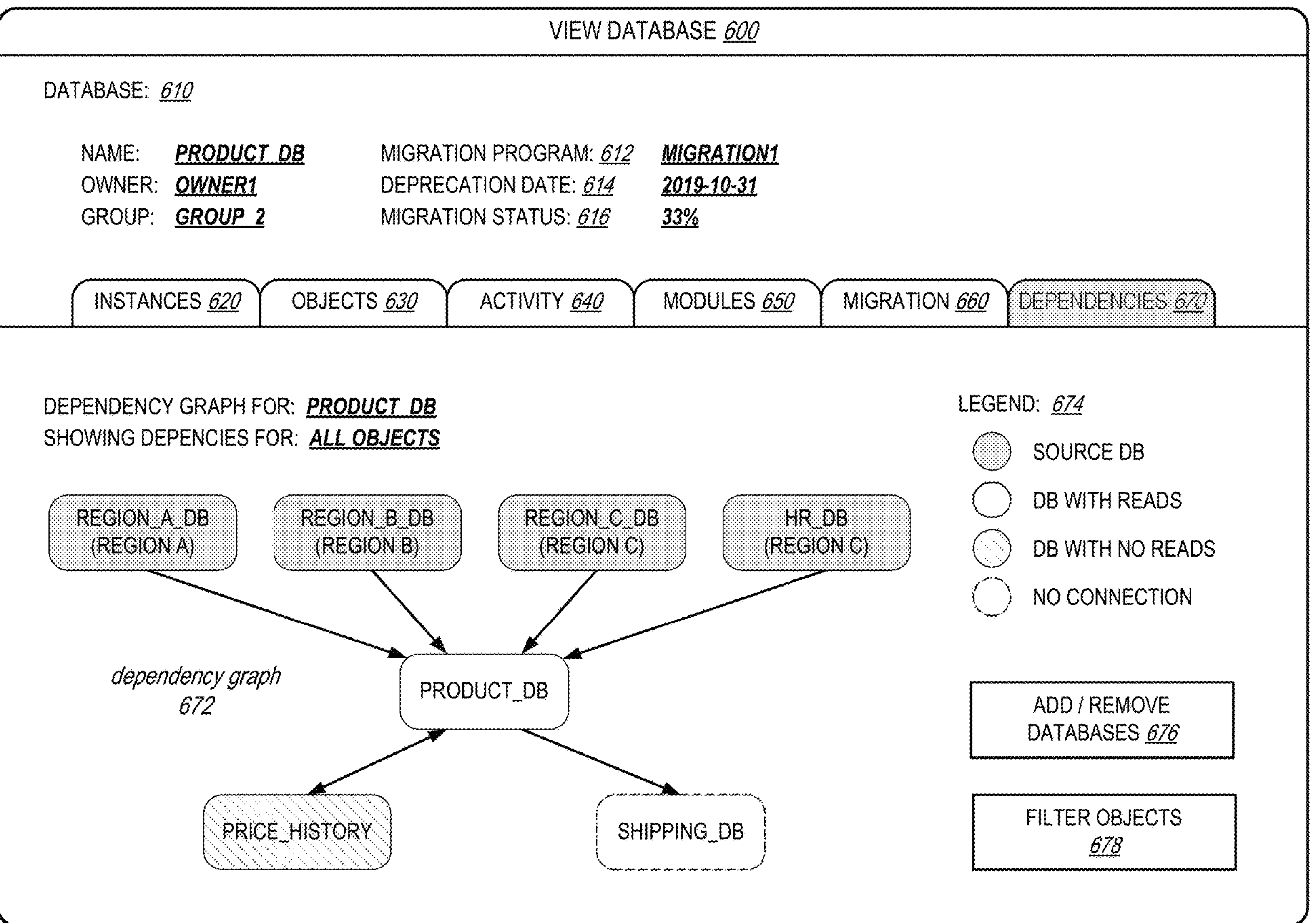

As shown in FIG. 6D, another tab 670 is selected. In this tab 670, which depicts database dependency information across databases, a user may view a dependency graph 672 based on activity data collected by the DDMS. In some embodiments, the depicted dependency graph 672 may be the database dependency graph 126, as discussed in connection with FIG. 1.

As shown, in this example, the dependency graph is generated for the data dependencies of just one database (PRODUCT_DB). However, in some embodiments, the visualization system may be used to generate dependency graphs for a set of multiple databases at the same time, or all databases in the inventory. For example, as shown, the user may click the add/remove database button 676 to add or remove databases included in the graph 672. As shown, in this example, some of the databases in the graph (e.g. REGION_A_DB) may indicate a region of the database. As discussed, in some embodiments, the DDMS may be used to monitor databases across many regions, locations, networks, or data centers, etc. In some embodiments, databases that are in a local region or location as the subject database (PRODUCT_DB) may not indicate its region.

As shown, in this example, the data dependencies in the graph are shown with arrows, which in this case indicates that data flows from a producer database to a consumer database. In some embodiments, this direction may be reversed, showing a direction of dependency from a consumer database to a producer database. In some embodiments, the direction of the dependency links may be configurable by the viewer. In this example, the graph 672 is generated based data dependencies seen for all objects in PRODUCT_DB. However, in some embodiments, the visualization system may allow the user to adjust this setting to display the graph to show dependencies for only a subset of database objects. For example, as shown, the user may click the filter objects button 678 to adjust the database objects that are used to generate the graph 672. As shown, in some embodiments, the databases in the graph 672 may be color or pattern-coded to indicate different properties about the databases. The color or pattern-coding may be generated based on the activity data collected by the DDMS, as shown in the legend 674.

Figure 6E:
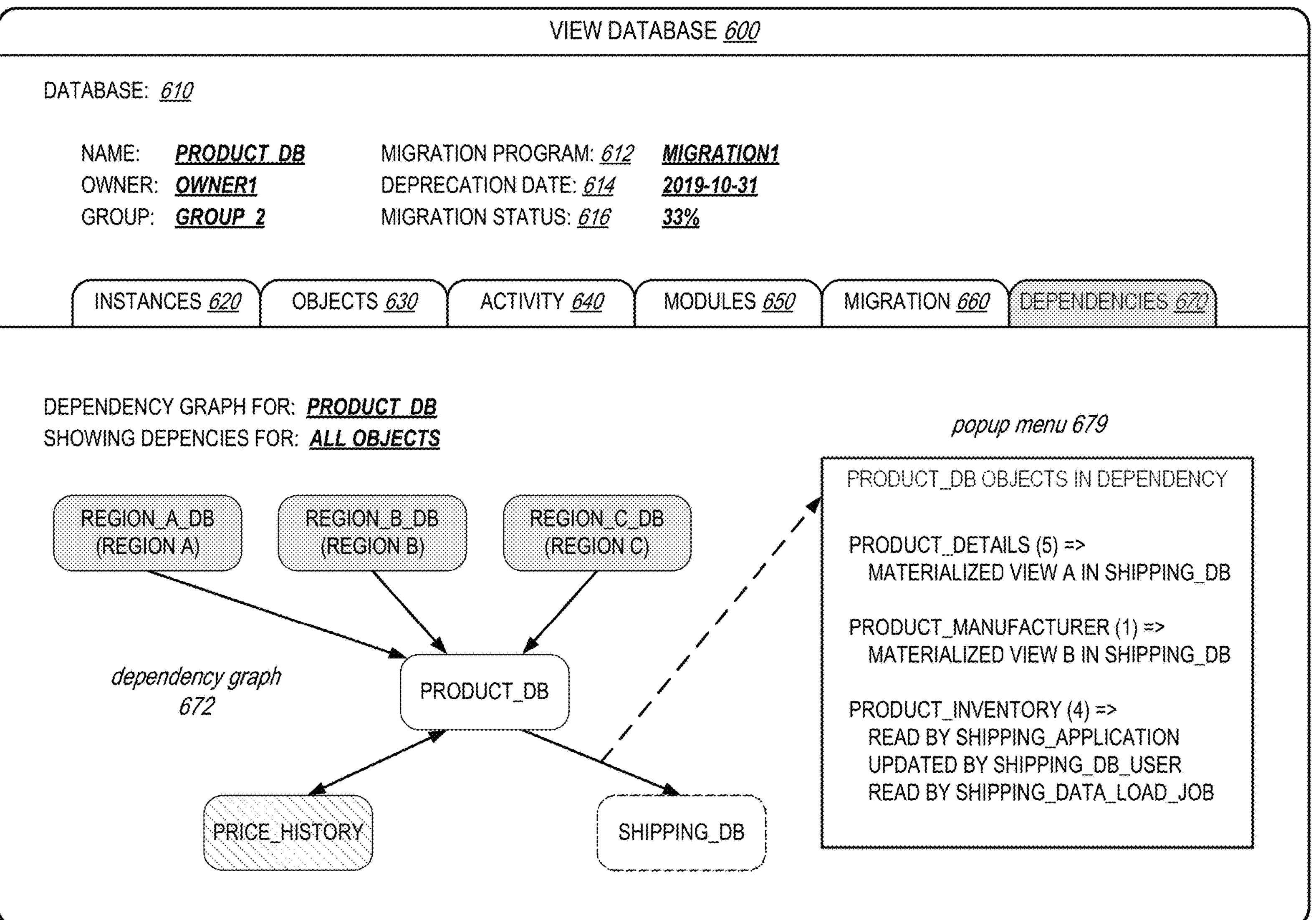

As shown in FIG. 6E, a popup menu 679 is displayed for the dependency graph 672. In some embodiments, the dependency graph 672 may be an interactive GUI component, whose elements may be selected to display or navigate to additional information about that elements. For example, in some embodiments, the individual databases shown in the graph may be clicked to take the user to detailed information about that database. As shown, a directed edge representing a data dependency may be clicked or otherwise selected (e.g. by hovering the user pointer over the dependency) to generate the popup menu 679.

As shown, the popup menu 679 may display a list of database objects that are part of the selected data dependency. As shown, in this example, the selected data dependency includes dependencies for three database objects in the database PRODUCT_DB. First, the PRODUCT_DETAILS table is used to refresh a materialized view in SHIPPING_DB. Second, a PRODUCT_MANUFACTURER table is used to generate a materialized view in SHIPPING_DB. Third, a PRODUCT_INVENTORY table is read by an application called SHIPPING_APPLICATION, which is related to SHIPPING_DB. Additionally, the PRODUCT_INVENTORY table is updated by a user SHIPPING_DB_USER, which also represents a type of dependency by SHIPPING_DB. Further, the PRODUCT_INVENTORY table is read by an ETL job called SHIPPING_DATA_LOAD_JOB, which is also associated with the database SHIPPING_DB. As discussed, in some embodiments, a data dependency may be based on many different types of dependency mechanisms, which may all be determined from the activity data collected by the DDMS. As shown, the popup menu 697 in this example also displays a number for each database object, which may indicate the number of other dependents that depend on that particular database object. In some embodiments, a user may click on one of the listed database objects in the menu 679 to navigate to additional information about that database object or database. In some embodiments, the user may click on one of the numbers in the menu 679 to generate another dependency graph for that database object or database.

Figure 6F:
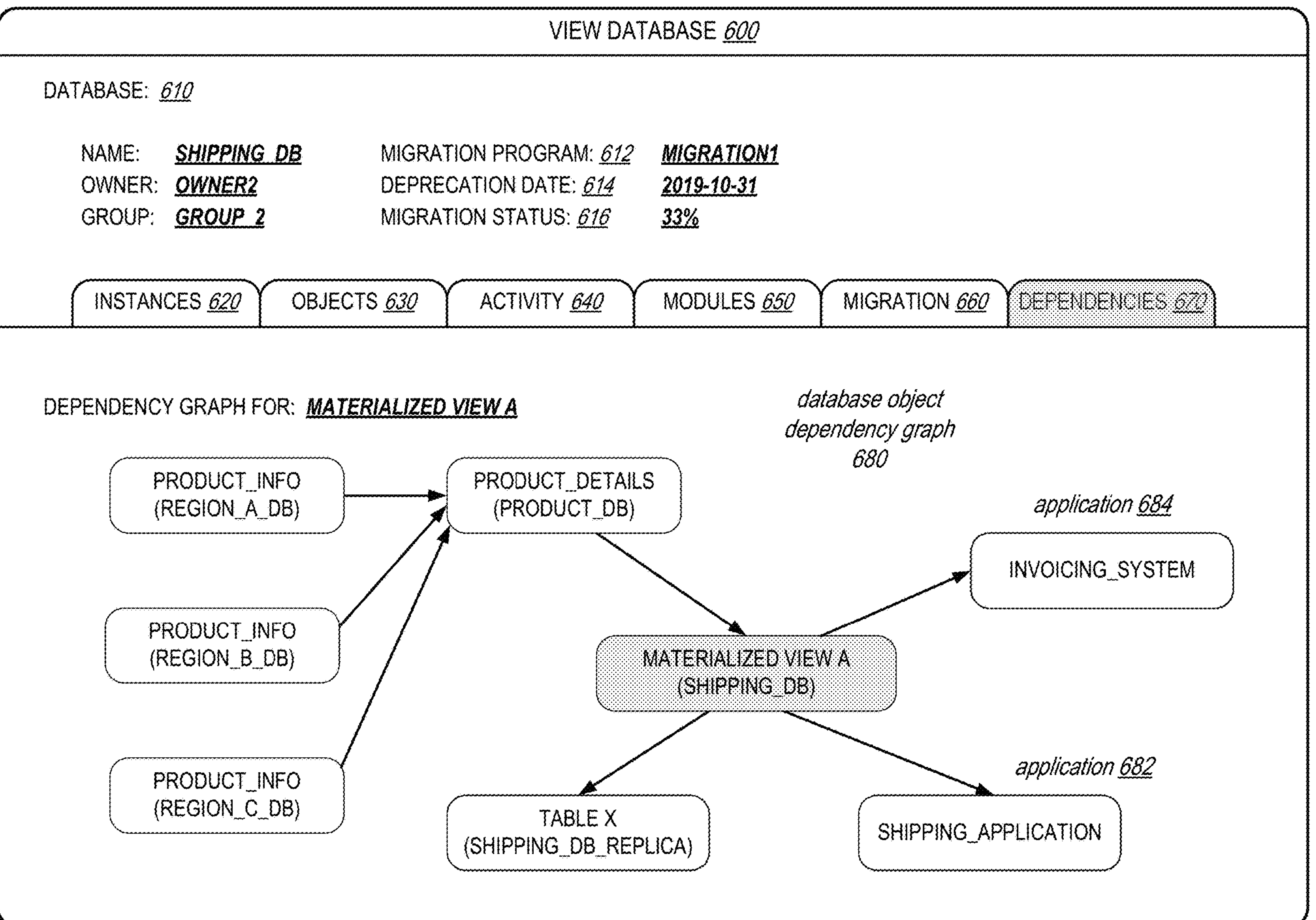

As shown in FIG. 6F, another dependency graph 680 is generated and displayed by the GUI. In this example, the dependency graph 680 is a database object dependency graph, which indicates the dependencies among different database objects, and also the applications or modules that use a database object. In some embodiments, this dependency graph 680 may be another type of graph that may be generated by the database metadata visualization system 120. For example, the graph 680 may be generated by clicking on the particular entry for materialized view A in popup menu 679, or by clicking on a button such as button 634.

As shown, in this example, this graph 680 depicts a multi-level graph, which shows not just the objects that materialized object A depend upon (e.g. PRODUCT_DETAILS in PRODUCT_DB), but also other objects that those source objects depend upon (e.g. the PRODUCT_INFO objects in REGION_A_DB, REGION_B_DB, and REGION_C_DB). In some embodiments, the visualization system may generate the dependency graph so that the graph may include dependency chains that include a large number of dependencies. In some embodiments, these dependencies may be discovered iteratively by querying the activity data collected, for example, by first finding the data dependencies for at a first level (e.g. PRODUCT_DETAILS), and then finding another level of dependencies for the new graph nodes at the first level (e.g. the PRODUCT_INFO objects), and so on, until no further dependencies are discovered. In some embodiments, a similar process may be used to determine all downstream dependencies for materialized view A. In this manner, a multi-level dependency graph may be constructed to include all data produces that contribute to materialize view A, and all data consumers that are impacted by materialized view A. The automated generation of this dependency graph 680 vastly simplifies manual processes of dependency determination, which can be tedious and time-consuming in enterprises with large numbers of databases. As may be understood, this multi-layered dependency graph may also be used to represent database-to-database dependencies, as shown in FIG. 6E.

As shown, in this example, the dependency graph 680 also indicates a number of application (e.g. applications 682 and 684) that rely or depend on materialized view A. In some embodiments, the visualization system may present this information from the collected activity data, to show applications that may be actively using a particular database object. For example, dependent applications may include GUI-based systems, ETL jobs or ongoing data feeds, or even particular users. In some embodiments, this information is also highly useful in a database migration management system, to allow the migration engineers to learn about different parts of the overall system to prepare for a database migration or deprecation.

Figure 7:
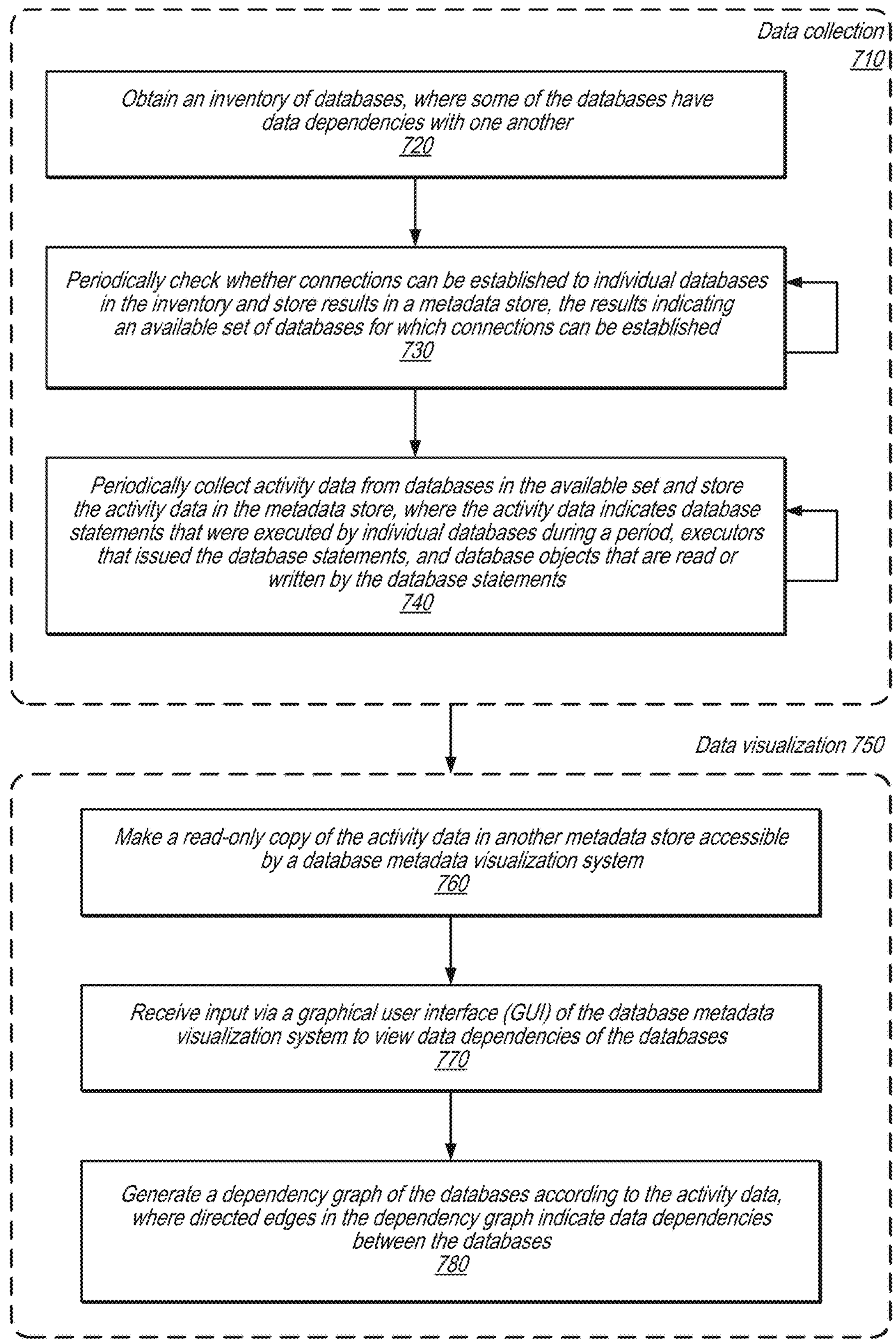
FIG. 7 is a flow diagram illustrating an example operation process of the DDMS, according to some embodiments.

FIG. 7 is a flow diagram illustrating an example operation process of the DDMS, according to some embodiments. As shown, in some embodiments, the depicted process may be divided into two sub-processes, a data collection process 710, and a data visualization process 750. In some embodiments, the data collection process 710 may be performed by database activity data collection system 130 of FIG. 1, and the data visualization process 750 may be performed by the database metadata visualization system 120 of FIG. 1.

As shown, the data collection process 710 includes operations 720, 730, and 740. At operation 720, an inventory of databases is obtained, where at least some of the databases in the inventory have data dependencies with other databases in the inventory. As discussed, because these databases may be owned or managed by different persons or organizations, these data dependencies may be not be generally known to any single person or organization. In some embodiments, the inventory of databases may be the inventory 132 of FIG. 1. In some embodiments, the inventory may be copied into a metadata store, for example, into a set of database objects or tables 520 and 522, as discussed in connection with FIG. 5A. In some embodiments, the inventory may include databases or an enterprise or company, which may span multiple organizations with the company. The databases may have dependencies such as cross-database materialized views, ongoing data feeds or ETL jobs, database links, etc. As discussed, because these databases are controls or owned by different organizations in a company, it may be generally difficult to gain a global view of the dependencies among these databases, particularly when these dependencies are changing over time.

At operation 730, periodic checks are performed to determine whether connections can be established to individual databases in the inventory, and the results of these checks are stored in a metadata store. The results of the checks may indicate an available set of databases for which connections can be established. In some embodiments, this operation may be performed by connection checker component 150 of FIG. 1 or the components depicted in FIG. 2A. In some embodiments, this checking is done as a separate step from the actual data collection step to allow the system to programmatically adapt to a changing inventory of databases. In some embodiments, by determining the connectivity or availability status of the database ahead of time, resources for subsequent data collection may be allocated more efficiently.

At operation 740, periodic collections are performed to collect activity data from the databases in the available set as determined in operation 730, and the activity data is stored in the metadata store. In some embodiments, the activity data may indicate database statements that were executed by individual databases during a collection period, executors that issued the database statements, and database objects that are read or written by the database statements. In some embodiments, this operation may be performed by the activity data collector component 152 of FIG. 1, or the components depicted in FIG. 2B. In some embodiments, the metadata store may be the metadata store 140 of FIG. 1. In some embodiments, the metadata store storing the activity data may be a distinct data store from the metadata store storing the set of available databases used by operation 730. In some embodiments, data collection may be performed by connecting to the databases and executing one or more query statements to gather the activity data. In some embodiments, operation 740 may be performed more frequently than operation 730. For example, operation 730 may be performed once a day, while operation 740 may be performed multiple times a day. Through this periodically collection of activity data, the DDMS may build up a body of historical metadata about the inventory of databases, which may be analyzed to extract database dependency information, usage information, or other types of information about the databases.

As shown, the data visualization process 750 includes operations 760, 770, and 780. At operation 760, a read-only copy of the activity data in the metadata store is created in another metadata store. The other metadata store may be the metadata store 122 of FIG. 1, and the other metadata store may be accessible by a database metadata visualization system, which may be implemented as the system 120 of FIG. 1. In some embodiments, the metadata visualization system may implement a database migration management system, as discussed previously. In some embodiments, the creation of the read-only metadata store is done to decouple the creation of the activity data from the reading of the activity data, to reduce load on the master metadata store. In the read-only metadata store may be optimized for certain read operations, for example, by implementing certain database indexes that are specific to the read-only metadata store.

At operation 770, input is received via a GUI of the database metadata visualization system to view data dependencies of the databases. In some embodiments, the GUI may include the view 600 as described in connection with FIGS. 6A to 6E. In some embodiments, the GUI may be provided via a web server as a set of webpages, which may then be rendered by a web browser at a client. In some embodiments, the GUI may include user control elements to allow a user to user generate a database-to-database dependency graph, for example, by clicking the button 634 shown in FIG. 6B.

At operation 780, a dependency graph of the databases is generated according to the activity data. In some embodiments, the graph may be similar to the dependency graph 672 shown in FIGS. 6D and 6E. In some embodiments, the edges in the graph may be directed edges that indicate individual data dependencies from a consumer database to a producer database. In some embodiments, the nodes in the graph may represent individual database objects, and the dependencies may represent dependencies from things other than databases, such as applications, other database objects, or users. Depending on the embodiment, the direction of the directed edges may point from consumer to producer, or producer to consumer. Depending on the embodiment, different types of data dependencies may include a materialized view that relies on a table or object in another database, a database-specific module, application, or executor that obtain data from another database, a database-specific user that reads or writes data in another database, an ETL job that obtains data from another database, among other types of dependencies. In some embodiments, the database metadata visualization system may generate the dependency from the collected activity data. In some embodiments, the dependency graph may be a multi-level graph, which indicates dependencies for not just immediate produces or consumers, but multiple levels of produces and multiple levels of consumers. For example, for a given database, the graph may indicate not just a first consumer database that depend from the given database, but all consumer databases of the child database, and all consumer databases of those consumer databases, and so on. In some embodiments, the dependency graph may indicate all such dependency paths that can be inferred from the observed activity data of all databases in the inventory. The dependency graph thus represents a point-in-time view of all the dependencies for a particular database or database object in the inventory, or even all databases or database objects in the inventory. In some embodiments, the generated graph may be an interactive GUI component whose elements can be used to display or navigate to additional information. In some embodiments, by hovering over an edge in the graph, the GUI may display a list of all database objects that are identified as part of the associated data dependency.

Figure 8:
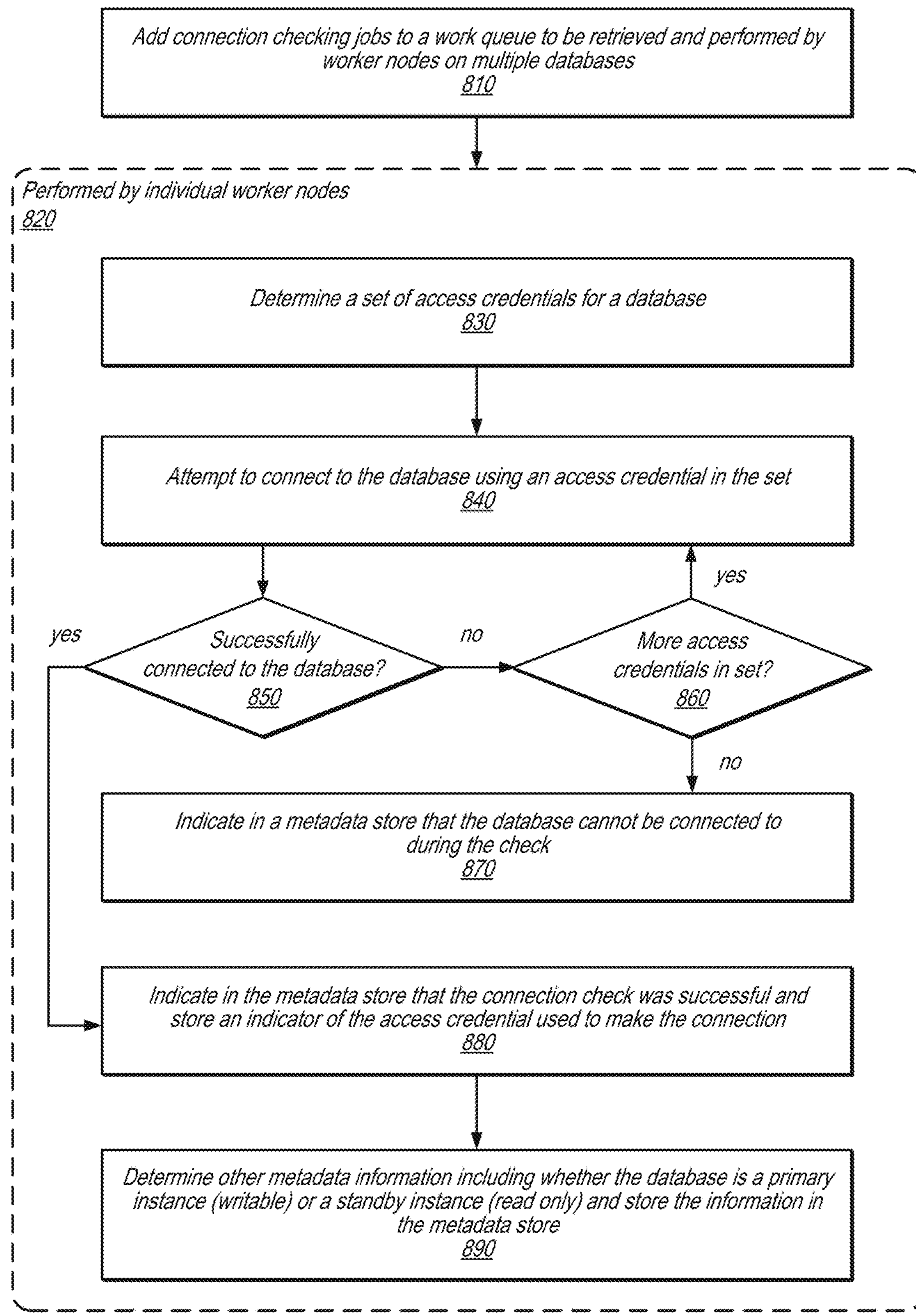
FIG. 8 is a flow diagram illustrating an example process of the DDMS checking for connectivity to the databases, according to some embodiments.

FIG. 8 is a flow diagram illustrating an example process of the DDMS checking for connectivity to the databases, according to some embodiments. In some embodiments, the depicted process may be performed by the connection checker component 150 of FIG. 1, or one or more components of FIG. 2A.

At operation 810, a set of connection checking jobs are added to a work queue to be received and performed by worker nodes on multiple databases. In some embodiments, this operation may be performed by the connection check jobs initiator 212 of FIG. 2A, the work queue may be the queue 216 of FIG. 2A, and the worker nodes may be the worker nodes 220 of FIG. 2A. In some embodiments, the checking jobs may be generated from the inventory of databases 132, to verify that connections can be established to these databases. In some embodiments, each database may be checked at least in part in parallel, by using a number of worker nodes, which may be implemented in an auto-scaled pool of worker nodes.

As shown, the process 820 is a process that may be performed by individual ones of the worker nodes (e.g. worker nodes 220 of FIG. 2A). At operation 830, a set of access credentials is determined for a database. In some embodiments, each database in the inventory may be associated with a set of one or more access credentials which may be used for the data collection. In some embodiments, if no connection credentials are found for a database, the worker node may report this as an error, which may be logged to the metadata store.

At operation 840, the connection check worker node may attempt to connect to the database using one of the access credentials in the set. In some embodiments, the connection attempt may include issuing a connection request to the database according to the server, port, address, etc., specified for that database, and using the access credential. The connection request may result in a response from the database indicating a successful connection, a denied connection, or result in no response at all.

At operation 850, if the connection attempt was successful, the process proceeds to operation 880. However, is the connection attempt was not successful, the process proceeds to operation 860. At operation 860, if the access credential attempted was no the last access credential for the database (e.g., there are more access credentials left in the set), the process proceeds back to operation 840, where a next access credential is used to attempt connection to the database. If there are no more access credentials left to try, the process proceeds to operation 870.

At operation 870, if connection cannot be successfully established with any access credential for the database, the worker node indicates in a metadata store that the database cannot be connected to during the check. In some embodiments, this indication may be made in the available database catalog 142 of FIG. 1, which maybe a table or database object in the metadata store 140. In some embodiments, the indication may be made as a direct response back to the metadata store or connection check jobs initiator 212. In some embodiments, the indication may be made as a job status (e.g. jobs status 226), which may be transmitted to the metadata store in another manner.

At operation 880, if a connection is successfully established to the database, the worker nodes indicates in the metadata store that the connection check was successful, and stores an indication of the access credential that was used to make the successful connection in the metadata store. In some embodiments, the access credential may be a user ID and password pair or an access key that can be used to connect to the database. In some embodiments, if this access credential successfully connects to the database, a pointer or some other indicator of the access credential may be store in the active database catalog. In some embodiments, the subsequent data collection operation may use this indicated access credential to make the data collection.

At operation 890, other metadata information about the database is determined, including whether the database is a primary instance (writable) or a standby instance (read only) and store the information in the metadata store. In some embodiments, certain metadata information which can be easily gathered may be piggybacked with the connection checking operation. In some embodiments, the metadata information collected at this stage may include changing information about the database such as its role (primary or standby), its size, its overall activity level, its logons, etc. In some embodiments, such metadata information may be used by the subsequent data collection operation to control how the data collection is performed.

Figure 9:
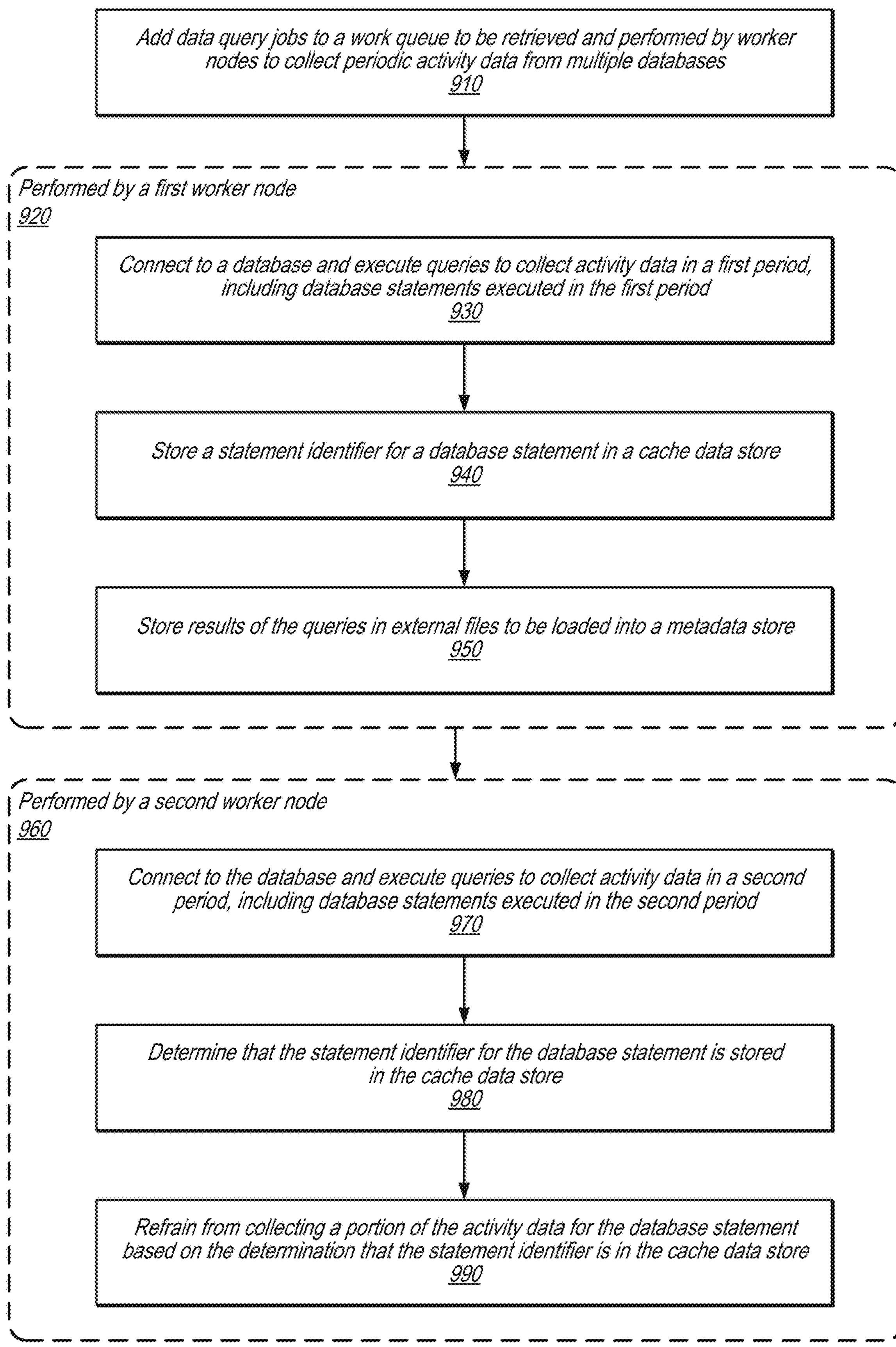
FIG. 9 is a flow diagram illustrating an example process of the DDMS collecting activity data from the databases, according to some embodiments.

FIG. 9 is a flow diagram illustrating an example process of the DDMS collecting activity data from the databases, according to some embodiments. In some embodiments, the depicted process may be performed by the activity data collector component 150 of FIG. 1, or one or more components of FIG. 2B.

At operation 910, data query jobs are added to a work queue to be retrieved and performed by worker nodes to collect periodic activity data from multiple databases. In some embodiments, this operation may be performed by the data query jobs initiator 232 of FIG. 2B, the work queue may be the queue 234 of FIG. 2B, and the worker nodes may be the worker nodes 240 of FIG. 2B. In some embodiments, the collection jobs may be generated based on the catalog of available databases 142, to perform the individual data query jobs. In some embodiments, each database may be checked at least in part in parallel, by using a number of worker nodes, which may be implemented in an auto-scaled pool of worker nodes.

As shown, process 920 may be a process performed by a first worker node (e.g. a worker node 240 of FIG. 2B). At operation 930, the worker node connects to a database a executes one or more queries to collect activity data in a first period. In some embodiments, the collected activity data may include database statements executed in the first period. In some embodiments, the activity data may also include executors associated with the database statements, and database objects read or written by the database objects. In some embodiments, the queries may be written in a way so as to minimize performance impact of the database, which may be a production instance actively servicing client requests. In some embodiments, the queries may be made against metadata tables provided by the database management system.

At operation 940, a statement identifier for a database statement is stored in a cache data store. In some embodiments, the cache data store may be the database statement cache 244 of FIG. 2B. In some embodiments, this cache data store may be the database being queried itself, a separate status store (e.g. status store 228), or the metadata store 140. In some embodiments, the statement identifier may be a unique identifier for a database statement (e.g. a SQL identifier that is unique to a particular SQL statement), which may be generated based on a hash of the text of the database statement. This statement identifier may later be used to determine whether information about the database statement has been previously been collected, and possibly skip certain collection or processing steps in later data collection jobs.

At operation 950, the results of the queries are stored in one or more external files, which are to be loaded to the metadata store. The external files may include the external files 156 of FIG. 1 or FIG. 4. In some embodiments, the external files may include data in a normalized or object-orientated format, which may capture the collected data in an object-structed form, which may be easily loaded into the metadata store. In some embodiments, the external files may be stored in a JSON format. In some embodiments, there may be one external file generated for each database instance, and one JSON object generated for each type of database statement seen during the collection. In some embodiments, each database statement object may have multiple associated nested objects, which may include objects capturing information about the executors of the database statements.

As shown, process 960 may be a process performed by a second worker node (e.g. a worker node 240 of FIG. 2B). As shown, the process 960 occurs after process 920, which may occur in an earlier data collection period. At operation 970, the second worker node connects to the database and execute queries to collect activity data in a second period, including database statements executed in the second period. This operation may be performed by the second worker node in similar fashion as described for operation 930. It is noted that although only two data collection operations are shown in the figure, the data collection process may generally be performed many times, as discussed. In some embodiments, the data collection operations may be performed on a periodic or schedule basis, in order to collect up-to-date activity data from the databases. In some embodiments, the schedule or frequency of the data collection may be configurable, for example, using a configuration interface. In some embodiments, the configuration may specify that for certain high-volume databases, the data collection may be performed more frequently.

At operation 980, a determination is made that the statement identifier of operation 940 is stored in the cache data store. For example, in some embodiments, the second worker node may discover that certain database statements were executed in the database in the second period. The second worker nodes may then check the cache data store to see if any of these database statements in the second period has been seen in previous data collection periods. In some embodiments, certain static information about a database statement may only need to be collected once, so that subsequent observations of the database statement may skip the collection or processing of this static information to reduce computing resource usage.

At operation 990, in response to the determination that the statement identifier is in the cache data store, the second worker node refrains from collection a portion of the activity data for the database statement. As discussed, this mechanism prevents certain static information about a database statement from being collected and/or processed repeatedly and needlessly, so that computing resource usage may be reduced in the databases. In some embodiments, such static information may include the database objects used by the database statements, which may include data objects in other databases to indicate a data dependency. The identification of such a data dependency may be avoided by the second worker node.

Figure 10:
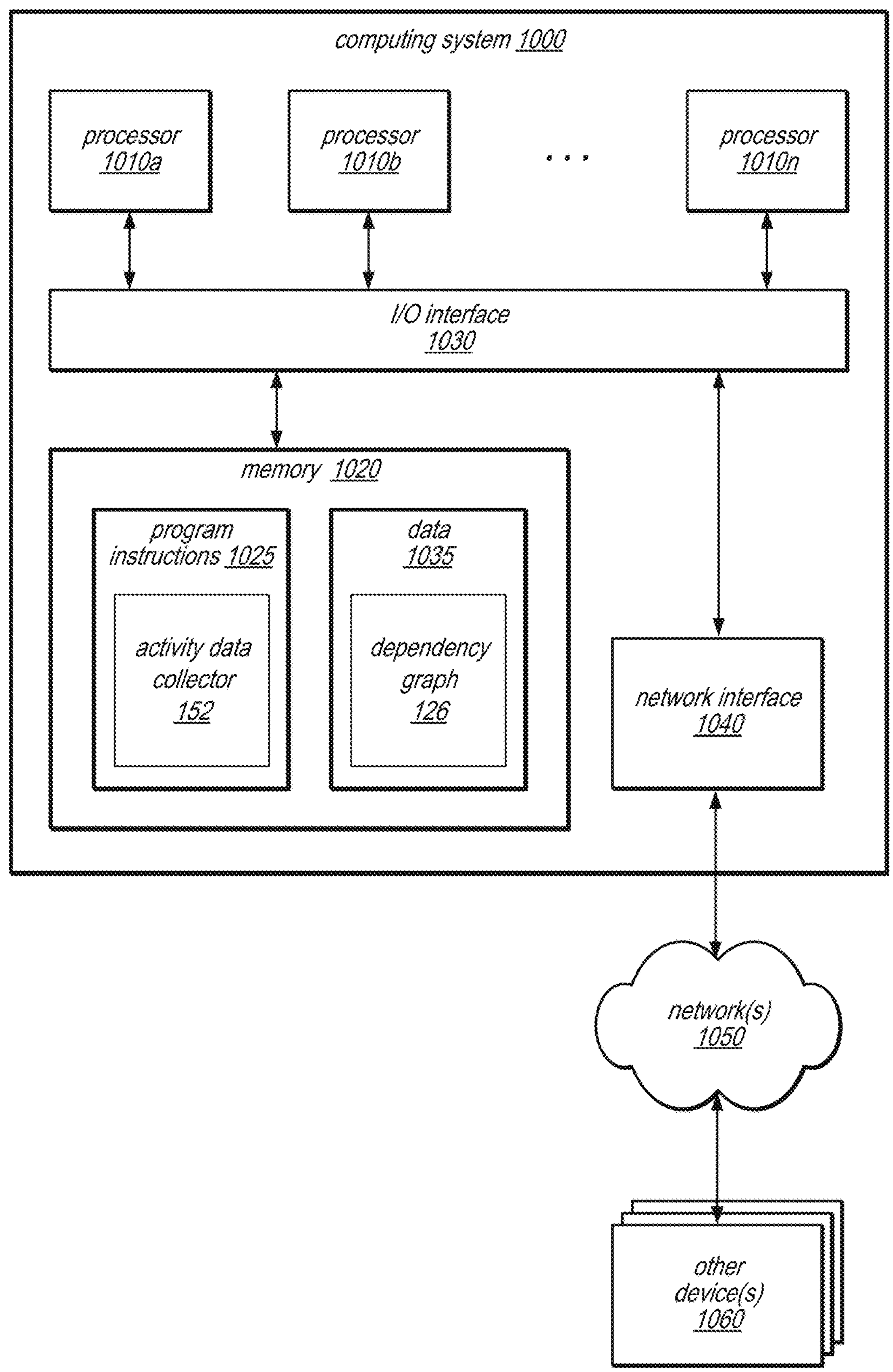
FIG. 10 is a block diagram illustrating an example computer system that can be used to implement one or more portions of DDMS that collects activity data from databases and generates a database dependency graph from the activity data, according to some embodiments.

FIG. 10 is a block diagram illustrating an example computer system that can be used to implement one or more portions of DDMS that collects activity data from databases and generates a database dependency graph from the activity data, according to some embodiments. Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1026. As shown, in some embodiments, the program instructions memory 1025 may be used to store one or more executable components of the DDSM, such as for example, the activity data collector 152. As shown, in some embodiments, the data memory 1035 may be used to store different types of data used by the DDMS, such as the dependency graph 126.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 9, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 9 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:

one or more computers configured with computer-executable code to implement a database dependency monitoring system (DDMS), configured to:

store an inventory of a plurality of databases, wherein at least some of the databases in the inventory have data dependencies on one or more other databases in the inventory;

periodically perform a database connection check on the databases in the inventory to collect database metadata about individual ones of the databases and store the database metadata in a metadata store, wherein the database metadata indicates (a) an available set of the databases that were successfully connected to during the database connection check, and (b) respective access credentials that were used by the database connection check to establish successful connections to individual databases in the available set;

periodically collect activity data from individual databases in the available set using the respective access credentials and store the activity data in the metadata store, wherein the activity data indicates database statements that were executed by the individual databases during a previous period, one or more executors that issued individual ones of the database statements, and one or more database objects that are read or written by the individual ones of the database statements;

discover, based at least in part on the activity data collected, a plurality of data dependencies between the databases;

responsive to input received via a graphical user interface (GUI), cause the GUI to display a dependency graph of the databases indicating the data dependencies discovered, wherein individual directed edges in the dependency graph indicate individual data dependencies between pairs of the databases, wherein the GUI provides one or more user controls to view additional information about elements of the dependency graph; and responsive to additional input received via the GUI that selects one of the directed edges between a source database and a target database in the dependency graph, cause the GUI to display additional information about a data dependency between the source database and the target database discovered based at least in part on the activity data collected and indicated by the directed edge, the additional information including a list of one or more target database objects in the target database that depends on a list of one or more source database objects in the source database.

2. The system of claim 1, wherein, to generate the dependency graph of the databases according to the activity data, the DDMS is configured to:

determine that a particular data dependency exists from a consumer database to a producer database based at least in part on activity data collected from the producer database, wherein the activity data indicates an executor of a database statement in the producer database, and the executor is a user, an application, or a host associated with the consumer database.

3. The system of claim 1, wherein to generate the dependency graph, the DDMS is configured to:

determine a first data dependency from a first database object in a first database to a second database object in a second database;

determine a second data dependency from the second database object to a third database object in a third database; and generate the dependency graph to indicate a dependency path that includes the first data dependency and second data dependencies.

4. The system of claim 3, wherein the DDMS is implemented using resources in a network-accessible service provider network, and to collect the activity data from the databases in the available set, the DDMS is configured to:

add respective data query jobs for individual ones of the databases in the available set to one or more work queues hosted in a queuing service provided by the service provider network;

provide a plurality of worker nodes to retrieve individual ones of the data query jobs from one of the one or more work queues and execute the data query jobs on respective ones of the databases in the available set, wherein the worker nodes are provided as an auto-scaled group of virtual machines hosted in a virtual machine hosting service provided by the service provider network;

provide storage space to store the one or more external files in a storage service provided by the service provider network; and provide a database instance as the metadata store in a database service provided by the service provider network.

5. The system of claim 1, wherein the DDMS is implemented as part of a database migration management system, configured to:

monitor migration status of a group of databases during a migration of the group of databases from a first database management system at a client premises to a second database management system in a network-accessible service provider network;

perform the periodic database connection check and the periodic collection of activity data for a first database in the group at the client premises and a second database in the group in the network-accessible service provider network; and generate another GUI that indicates the migration status of the databases in the group.

6. A method, comprising:

performing, by one or more computers that implement a database dependency monitoring system (DDMS):

periodically performing a database connection check on databases in an inventory to collect database metadata about whether connections can be established to individual ones of the databases in an inventory of databases and storing the database metadata results of the checking in a metadata store, wherein the database metadata results indicates (a) an available set of the databases that were successfully connected to during the database connection check, and (b) respective access credentials that were used by the database connection check to establish successful connections to individual databases in the available set;

periodically collecting activity data from individual databases in the available set using the respective access credentials and storing the activity data in the metadata store, wherein the activity data indicates database statements that were executed by the individual databases during a previous period and one or more executors that issued individual ones of the database statements;

discovering, based at least in part on the activity data collected, a plurality of data dependencies between the databases;

responsive to input received via a graphical user interface (GUI), cause the GUI to display a dependency graph of the databases indicating the data dependencies discovered, wherein individual directed edges in the dependency graph indicate individual data dependencies between pairs of the databases; and responsive to additional input received via the GUI that selects one of the directed edges between a source database and a target database in the dependency graph, causing the GUI to display additional information about a data dependency between the source database and the target database discovered based at least in part on the activity data collected and indicated by the directed edge, including a list of one or more target database objects in the target database that depends on a list of one or more source database objects in the source database.

7. The method of claim 6, wherein said generating the dependency graph of the databases comprises:

determining that a particular data dependency exists from a consumer database to a producer database based at least in part on activity data collected from the producer database, wherein the activity data indicates an executor of a database statement in the producer database, and the executor is a user, an application, or a host associated with the consumer database.

8. The method of claim 6, wherein said generating of the dependency graph of the databases comprises:

determining that a particular data dependency exists from a consumer database to a producer database based at least in part on activity data collected from a consumer database, wherein the activity data indicates a first database object in the consumer database that refers to the producer database.

9. The method of claim 6, wherein said collecting the activity data from an individual database in the available set comprises:

connecting to the database and executing one or more queries for the activity data in the database;

storing results of the one or more queries in one or more external files; and transforming and loading the one or more external files to the metadata store.

10. The method of claim 6, wherein the DDMS is implemented using resources in a network-accessible service provider network, and said collecting the activity data from the databases in the available set comprises:

adding respective data query jobs for individual ones of the databases in the available set to one or more work queues hosted in a queuing service provided by the service provider network; and providing a plurality of worker nodes to retrieve individual ones of the data query jobs from one of the one or more work queues and execute the data query jobs on respective ones of the databases in the available set, wherein the worker nodes are provided as an auto-scaled group of nodes provided by the service provider network.

11. The method of claim 6, wherein said database connection check for an individual database in the inventory comprises:

attempting to connect to the database using multiple access credentials and successfully connecting to the database with one of the access credentials; and storing an indicator for the one access credential that successfully connected to the database in the metadata store, wherein the indicator indicates to use the one access credential to perform said collecting of activity data from the database.

12. The method of claim 6, wherein said database connection check for an individual database in the inventory comprises determining whether the database is a primary database instance that can be updated or a standby database instance that is read only.

13. The method of claim 6, where said periodically collecting the activity data from an individual database in the available set comprises:

in a first period, performing one or more queries for collecting activity data for a particular database statement and in the database, and storing a statement identifier for the particular database statement in a cache data store; and in a second period, determining that the statement identifier for the particular database statement is stored in the cache data store, and refrain from collecting at least a portion of the activity data for the particular database statement based at least in part on the determination that the statement identifier is stored in the cache data store.

14. The method of claim 6, further comprising:

storing a read-only copy of the activity data in another metadata store; and wherein said generating the dependency graph is performed using the read-only copy of the activity data stored in the other metadata store.

15. The method of claim 6, wherein the DDMS is implemented as part of a database migration management system, and further comprising performing, by the database migration management system:

monitoring migration status of a group of databases during a migration of the group of databases from a first database management system at a client premises to a second database management system in a network-accessible service provider network;

performing the periodic database connection check and the periodic collection of activity data for a first database in the group at the client premises and a second database in the group in the network-accessible service provider network; and generating another GUI that indicates the migration status of the databases in the group.

16. The method of claim 6, wherein generating the dependency graph comprises:

including in the dependency graph a data dependency from an application to a particular database, determined according to the activity data.

17. The method of claim 6, wherein the information about the data dependency indicates that the source database object is used by one or more of:

an application association with the target database, a user associated with the target database, and a data loading job associated with the target database.

18. One or more non-transitory computer-accessible storage media storing program instructions that when executed on or across one or more processors of a database dependency monitoring system (DDMS), cause the DDMS to:

periodically initiate a plurality of database connection checking jobs on databases in an inventory to collect database metadata about individual ones of the databases and store the database metadata in a metadata store, wherein the database metadata indicates (a) an available set of the databases that were successfully connected to during the database connection checking jobs, and (b) respective access credentials that were used by the database connection checking jobs to establish successful connections to individual databases in the available set;

periodically initiate a plurality of data collection jobs to collect activity data from individual databases in the available set using the respective access credentials and store the activity data in the metadata store, wherein the activity data indicates database statements that were executed by the individual databases during a previous period and one or more executors that issued individual ones of the database statements; and discover and store, based at least in part on the activity data collected, a plurality of data dependencies between the databases;

wherein the data dependencies are used to generate a dependency graph of the databases, wherein individual directed edges in the dependency graph indicate individual ones of the data dependencies between respective pairs of source databases and target databases discovered based at least in part on the activity data, and one or more of the data dependencies is associated with additional information indicating a list of one or more target database objects in a target database that depends on a list of one or more source database objects in a source database.

19. The one or more non-transitory computer-accessible storage media of claim 18, wherein the DDMS is implemented using resources in a network-accessible service provider network, and to initiate the data collection jobs, the program instructions when executed on or across the one or more processors cause the DDMS to:

cause respective ones of the data collection jobs to be added to one or more work queues hosted in a queuing service provided by the service provider network; and cause a plurality of worker nodes to be provided to retrieve individual ones of the data collection jobs from one of the one or more work queues and execute the data collection jobs on respective ones of the databases in the available set, wherein the worker nodes are provided as an auto-scaled group of nodes provided by the service provider network.

20. The one or more non-transitory computer-accessible storage media of claim 18, wherein the DDMS is implemented as part of a database migration management system, and the dependency graph is displayed via a graphical user interface (GUI) generated by database migration management system that indicates migration status of the databases.

* * * * *